(12) United States Patent
Ko

(10) Patent No.: US 10,739,156 B2
(45) Date of Patent: *Aug. 11, 2020

(54) ELECTRONIC APPARATUS AND CONTROL METHOD THEREOF

(71) Applicant: THINKWARE CORPORATION, Seongnam-si, Gyeonggi-do (KR)

(72) Inventor: Suk Pil Ko, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,341

(22) Filed: May 8, 2018

(65) Prior Publication Data

US 2018/0252546 A1    Sep. 6, 2018

Related U.S. Application Data

(63) Continuation of application No. 15/605,485, filed on May 25, 2017, now Pat. No. 9,983,018, which is a continuation of application No. 14/742,004, filed on Jun. 17, 2015, now Pat. No. 9,677,898.

(30) Foreign Application Priority Data

Jun. 17, 2014  (KR) .................. 10-2014-0073727
Nov. 7, 2014   (KR) .................. 10-2014-0154597

(51) Int. Cl.
 *G01C 21/36*  (2006.01)
 *G06T 7/73*   (2017.01)
 *G06K 9/00*   (2006.01)

(52) U.S. Cl.
 CPC ..... *G01C 21/3602* (2013.01); *G06K 9/00798* (2013.01); *G06T 7/73* (2017.01); *G06T 2207/30256* (2013.01)

(58) Field of Classification Search
 CPC .......... G01C 21/3602; G06T 7/73; G06T 2207/30256; G06K 9/00798
 See application file for complete search history.

(56) References Cited

U.S. PATENT DOCUMENTS

| | | | |
|---|---|---|---|
| 2011/0052042 A1* | 3/2011 | Ben Tzvi | G06T 19/006 382/154 |
| 2011/0098919 A1 | 4/2011 | Irie | |
| 2011/0184641 A1* | 7/2011 | Arie | G01C 21/3658 701/533 |
| 2015/0241232 A1* | 8/2015 | Park | G08G 1/166 701/412 |

FOREIGN PATENT DOCUMENTS

WO    2013/018962 A1    2/2013

* cited by examiner

*Primary Examiner* — Yuen Wong
(74) *Attorney, Agent, or Firm* — Novick, Kim & Lee, PLLC; Sang Ho Lee

(57) ABSTRACT

Provided herein is control method of an electronic apparatus, comprising: identifying a line region from a driving-related image data of a vehicle; generating a line information corresponding to a lane where the vehicle is located from an image data of the identified line region portion; generating a position information of a lane where the vehicle is located, using at least one of the generated line information and the lane information of a road where the vehicle is located; and performing a driving-related guide of the vehicle using the generated lane position information.

18 Claims, 19 Drawing Sheets

| Nations | Left line | Right line | Lane position |
|---------|-----------|------------|---------------|
| KR | Yellow solid line | White dotted line | First lane |
| KR | Yellow dotted line | White solid line | First lane |
| KR | White solid line | White dotted line | First lane |
| KR | White dotted line | White solid line | Last lane |
| KR | White dotted line | Yellow solid line | Last lane |
| KR | White solid line | Yellow dotted line | Last lane |
| KR | White dotted line | Yellow dotted line | Last lane |
| .... | .... | .... | ... |

FIG. 9

| Nations | Left line | Right line | Lane position |
|---|---|---|---|
| KR | Yellow solid line | White dotted line | First lane |
| KR | Yellow dotted line | White solid line | First lane |
| KR | White solid line | White dotted line | First lane |
| KR | White dotted line | White dotted line | Center lane |
| KR | White solid line | White solid line | Center lane |
| KR | White dotted line | White solid line | Last lane |
| KR | White dotted line | Yellow solid line | Last lane |
| KR | White solid line | Yellow dotted line | Last lane |
| KR | White dotted line | Yellow dotted line | Last lane |
| …. | …. | …. | … |

FIG. 10

ELECTRONIC APPARATUS AND CONTROL METHOD THEREOF

CROSS-REFERENCE TO RELATED APPLICATIONS

This application is a continuation application of U.S. nonprovisional application Ser. No. 15/605,485 filed on May 25, 2017, which is in turn a continuation application of U.S. nonprovisional application Ser. No. 14/742,004 filed on Jun. 17, 2015, which claims priority from Korean Patent Application Nos. 10-2014-0073727, filed on Jun. 17, 2014, and 10-2014-0154597, filed on Nov. 7, 2014, in the Korean Intellectual Property Office, the disclosures of which are incorporated herein by reference in their entirety.

BACKGROUND OF THE INVENTION

1. Field of the Invention

The present invention relates to an electronic apparatus and a control method thereof, and in particular to an electronic apparatus and a control method thereof which can perform a position recognition of a lane where a vehicle is located, and a driving-related guide according to the same.

2. Description of the Related Art

The most important thing when a user drives a vehicle is a safe driving and a prevention of any traffic accident. For this, a variety of assistant devices and a safety device, for example, a safety belt, an airbag, etc. are provided in a vehicle in order to perform the functional functions of vehicle component devices.

Furthermore, a device, for example, a black box, is increasingly installed in a vehicle so as to investigate the reasons for a vehicle accident when a vehicle has an accident in such a manner to store the running-related images of a vehicle and the data transferred from various sensors. A portable terminal, for example, a smart phone, a tablet, etc. is equipped with the function of a black box or a navigation application, etc. and is usually used as one of vehicle devices.

However, the applicability of such running-related images is actually low in the vehicle devices. More specifically, even though the running-related images of a vehicle are obtained through a vision sensor, for example, a camera provided in the vehicle, the electronic apparatus of the vehicle is designed to simply display or transmit such data or generate a simple alarming information, for example, a line departing state, etc.

In addition, as an electronic apparatus for a vehicle which becomes newly commercial in recent years, a HUD (Head Up Display) or an augmented reality interface are proposed, however the applicability of the running-related images of a vehicle is a simple display or a simple generation of alarming information.

SUMMARY OF THE INVENTION

Accordingly, the present invention is made in an effort to resolve the above problems. It is an object of the present invention to provide an electronic apparatus and a control method thereof which provides to generate a position information of a lane where a vehicle is located, using a driving-related image data of a vehicle and to perform a driving-related guide based on the same.

It is another object of the present invention to provide an electronic apparatus and a control method thereof which provide to effectively perform a driving-related guide according to an augmented reality (AR).

To achieve the above objects, there is provided a control method of an electronic apparatus, comprising: identifying a line region from a driving-related image data of a vehicle; generating a line information corresponding to a lane where the vehicle is located from an image data of the identified line region portion; generating a position information of a lane where the vehicle is located using at least one of the generated line information and the lane information of a road where the vehicle is located; and performing a driving-related guide of the vehicle using the generated lane position information.

In addition, the line information includes a line type information and a line color information which each correspond to the lines formed at both sides of the lane where the vehicle is located.

In addition, generating the lane position information includes: obtaining a lane information of the road where the vehicle is located from a map data; determining whether or not the vehicle is located on the first lane or the last lane of the load using the generated line information; and generating the position information of the lane where the vehicle is located by reflecting the lane information of the road, if the vehicle is located on the first lane or the last lane.

In addition, generating the lane position information further includes: wherein if the lane where the vehicle is located changes to the lane positioning between the first lane and the last lane according to the lane change of the vehicle, updating the generated lane position information with the changed lane position information.

In addition, if the lane where the vehicle is located changes from the lane which is located between the first or last lane to the first lane or the last lane according to the lane change of the vehicle, regenerating the position information of the lane where the vehicle is located by reflecting the lane information of the road where the vehicle is located.

In addition, the performing the driving-related guide of the vehicle includes: outputting a lane change guide using the navigation route of the vehicle and the lane position information.

In addition, the performing the driving-related guide of the vehicle includes: outputting a lane guide where the vehicle is located using the lane position information.

In addition, there is further comprising: outputting an appropriate line departure guide based on the type of the line, formed at both sides of the lane where the vehicle is located which is identified based on the line information.

In addition, the outputting comprises: generating an indicator for performing the driving-related guide; and outputting the generated indicator through the AR.

To achieve the above objects, there is provided an electronic apparatus, comprising a line information generation unit which identifies a line region from a driving-related image data of a vehicle and generates a line information corresponding to a lane where the vehicle is located from the image data of the identified line region portion; a lane position information generation unit which generates a position information of a lane where the vehicle is located using at least one the generated line information and the lane information of the road where the vehicle is located; and a control unit which performs a driving-related guide of the vehicle using the generated lane position information.

In addition, the line information includes a line type information and a line color information which each correspond to each lines formed at both sides of the lane where the vehicle is located.

In addition, the lane position information generation unit is configured to obtain a lane information of the road where the vehicle is located from a map data, determines using the generated line information, whether or not the vehicle is located on the first lane or the last lane of the road, and if the vehicle is located on the first lane or the last lane, generates a position information of the lane where the vehicle is located by reflecting the lane information of the road.

In addition, if the lane where the vehicle is located changes to the lane between the first lane and the last lane according to the lane change of the vehicle, the lane position information generation unit updates the generated lane position information with the changed lane position information.

In addition, if the lane where the vehicle is located changes from the lane which is located between the first or last lanes to the first lane or the last lane according to the lane change of the vehicle, the lane position information generation unit regenerates a position information of a lane where the vehicle is located by reflecting the lane information of the road where the vehicle is located.

In addition, the control unit controls for the output unit to output a lane change guide using the navigation route of the vehicle and the lane position information.

In addition, the control unit is configured to control the output unit for output a lane guide where the vehicle is located using the lane position information.

In addition, the control unit is configured to control the output unit to select and output an appropriate line departure guide based on the type of the line, formed at both sides of the lane where the vehicle is located which is identified based on the line information.

In addition, the control unit is configured to generate an indicator for performing the driving-related guide and control the output unit to output the generated indicator through the AR.

To achieve the above object, there is provided a control method of an electronic apparatus, comprising: receiving a user input which requests a route guide; generating a route guide line based on a destination information corresponding to the request; correcting the generated route guide line by reflecting a running trace radius of an actually running vehicle; performing a variable 3D process by changing, with respect to the corrected route guide line, the height based on the distance to the user's vehicle; mapping a texture onto a 3D data generated based on the variable 3D process, thus generating a route guide indicator; and outputting the route guide indicator on a screen through the AR.

In addition, the correcting the route guide line includes: adding vertexes to the route guide line of the user's vehicle front section for a straight line; adding vertexes to the curve section of the route guide line for a curve line; and generating the route guide line to which the running trace radius of the actually running vehicle is reflected by using the added vertexes.

In addition, the performing the variable 3D process includes: generating a virtual route guide line at both sides of the corrected route guide line; calculating the height value of the vertexes contained in the corrected route guide line to increase in proportion to the distance to the user's vehicle; and performing a 3D process through a polygonization with respect to the vertexes of the route guide line the height value of which is calculated, and the vertexes each included in the virtual route guide line.

In addition, the generating the route guide indicator generates a route guide indicator by mapping into the 3D data, the texture having a displacement based on the vehicle speed.

In addition, there are further provided performing a calibration to estimate a camera parameter corresponding to the camera using a photographed image taken by the camera; and generating a virtual 3D space from the photographed image based on the camera parameter, wherein the outputting comprises: outputting by combining the generated route guide indicator with the generated virtual 3D space.

To achieve the above objects, there is provided an electronic apparatus, comprising an input unit which receives a user input which requests a route guide; a route guide line generation unit which generates a route guide line based on a destination information corresponding to the request; a route guide indicator generation unit which generates a route guide indicator for a route guide in the AR using the generated route guide line; and a display unit which outputs the generated route guide indicator on a screen through the AR, wherein the route guide indicator generation unit includes a route guide line process unit which corrects the generated guide line by reflecting a running trace radius of the actually running vehicle; a route guide line 3D process unit which performs a variable 3D process by changing, with respect to the corrected route guide line, the height based on the distance to the user's vehicle; and a texture mapping unit which maps a texture onto the generated 3D data based on the variable 3D process, thus generating a route guide indicator.

In addition, the route guide line process unit adds vertexes to the route guide line of the user's vehicle front section for a straight line, adds vertexes to the curve section of the route guide line for a curve line, and generates the route guide line to which the running trace radius of the actually running vehicle is reflected by using the added vertexes.

In addition, the route guide line 3D process unit generates a virtual route guide line at both sides of the corrected route line, calculates a height value for the height values of the vertexes included in the corrected route guide line to increase in proportion to the distance to the user's vehicle, and performs a 3D process, through a polygonization with respect to the vertexes of the route guide line the height value of which is calculated, and the vertexes included in the virtual route guide lines.

In addition, the texture mapping unit generates a route guide indicator by mapping into the 3D data the texture having a displacement based on the speed of the vehicle.

In addition, there are further provided a calibration unit which performs a calibration to estimate a camera parameter corresponding to the camera using a photographed image taken by the camera; and a 3D space generation unit which generates a virtual 3D space from the photographed images based on the camera parameter, wherein the display unit combines the generated route guide indicator with the generated virtual 3D space and outputs it.

To achieve the above objects, there is provided a recording medium with a program code which can execute on a computer the above-described methods.

According to various embodiments of the present invention, the line information corresponding to the lane where the vehicle is located is generated from the image data of the line region portion, and necessary processes may be performed. Therefore, it is possible to perform various information processes including a line interface output, which uses a line information, and an AR interface generation.

In addition, according to various embodiments of the present invention, in case where the center lanes of the road are multiple in number (for example, in case where the number of lanes is 4 or more than 4), it is possible to accurately know the lane where the vehicle is located among the multiple center lanes.

In addition, according to various embodiments of the present invention, a driver's assistant role can be performed by determining the lane where the vehicle is located and guiding the driver.

In addition, according to various embodiments of the present invention, an accurate lane change alarming can be performed using the route information of the navigation and the lane where the vehicle is located thus enhancing user's conveniences.

In addition, according to various embodiments of the present invention, an appropriate lane change alarming can be selectively performed according to the type of the line at both sides of the lane where the vehicle is running, using the line information, thus enhancing the performance of the lane change alarming along with enough information.

In addition, according to various embodiments of the present invention, a route guide indicator appropriate to the AR can be constructed in real time through the 3D process of the route guide line, so the 3D route guide indicator can be effectively displayed like reality on the 2D camera images. Namely, it is possible to express the images wherein the route guide line positions on the reality-like road, not the display of the route guide line in a simple type like in the conventional AR navigation.

BRIEF DESCRIPTION OF THE DRAWING

FIG. 9 is a view depicting a lane decision table according to an embodiment of the present invention.

FIG. 10 is a view illustrating a lane judgment table according to another embodiment of the present invention.

DETAILED DESCRIPTION OF THE PREFERRED EMBODIMENT

Figure 1:
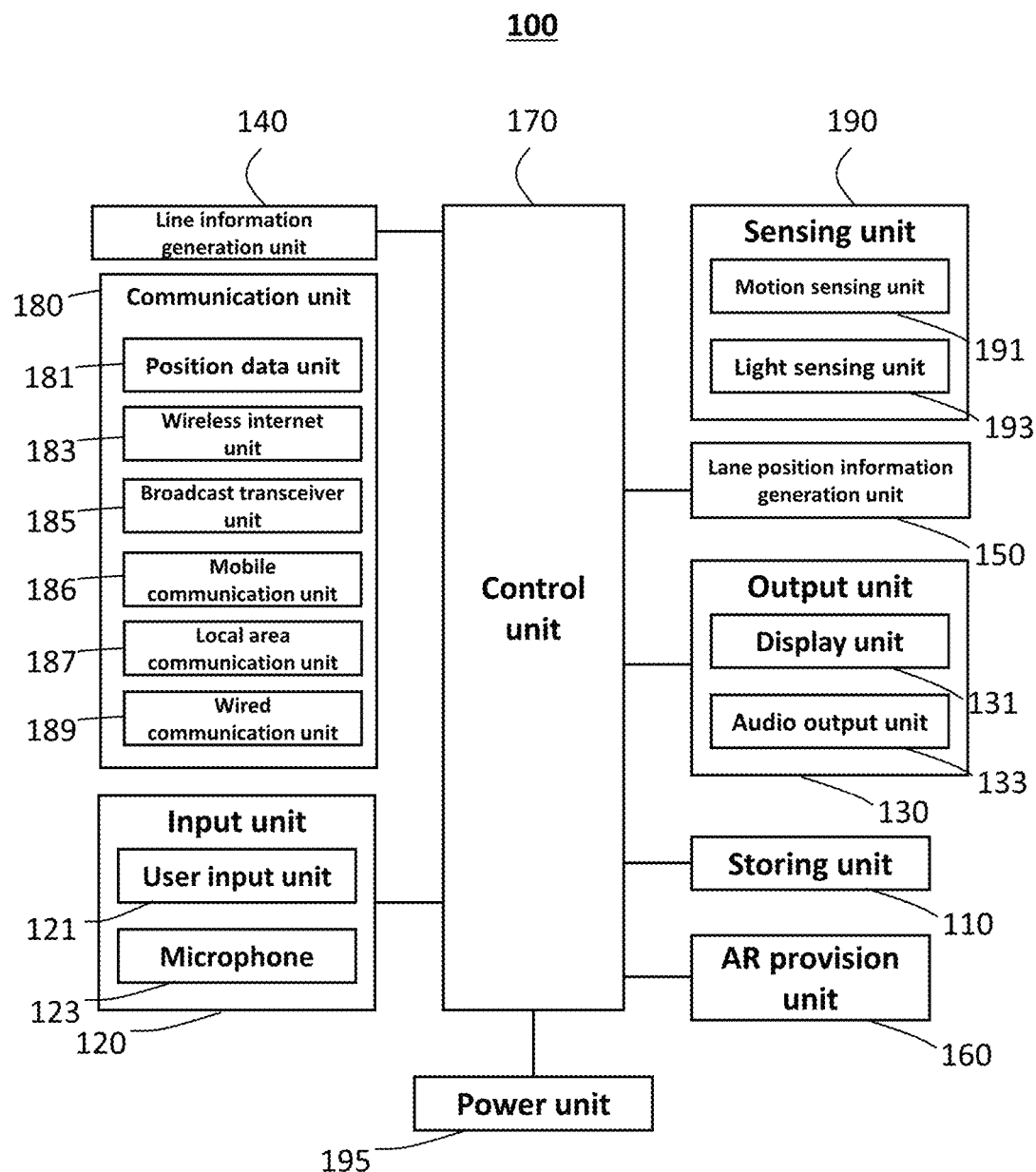
FIG. 1 is a block diagram depicting an electronic apparatus according to an embodiment of the present invention.

The descriptions hereinafter propose the principles of the invention, so it is obvious that a person having ordinary skill in the art can implement the principle of the invention even though it is not described or depicted in the present specification and can invent various apparatuses included in the concept and scope of the invention. In addition, it should be understood that the conditional terms and embodiments listed in the present invention are principally intended to help the concepts of the present invention to be fully understood, not limiting the listed embodiments and states.

In addition, it should be understood that all the detailed descriptions listing the principle, view point and embodiments as well as specific embodiments of the present invention are intended to include the structural and functional equivalents of these matters. In addition, it should be understood that these equivalent matters include all the devices invented to perform the same functions irrespective of the currently known equivalent matters as well as the equivalent matters, namely, structures which will be developed in the future.

Therefore, for example, it should be understood that the block diagrams of the present specification are intended to show the conception view points of the exemplary circuits which embody the principles of the present invention. In similar ways, all the flows, state conversion diagrams, pseudo codes, etc. may be substantially expressed on a computer readable medium and may represent various processes which can be executed by a computer or a processor irrespective of whether the computer or the processor is clearly illustrated or not.

The functions of various element depicted in the drawings and including the processor or the functional blocks indicates in the form of similar concepts may be executed using an exclusive hardware as well as the hardware which has abilities to execute the related software. When it is provided by the processor, the above functions may provided by a single exclusive processor, a single shared processor or a plurality of individual processors, and a part of them may be shared.

The correct use of the processor or the term which is suggested as a concept similar therewith should not be interpreted in such a way to exclusively cite the hardware which has an ability to execute software, and it should be interpreted that it is indented to implicitly include ROM, RAM and a nonvolatile memory. Well known other hardware may be included.

In the claims of the present specification, the components expressed as a method for executing the functions recited in the detailed descriptions are intended to include all the methods for executing the functions which include all types of software including a combination of circuit elements performing, for example, the above functions or a firmware/micro code, etc. and may be combined with an appropriate circuit to execute the software. It should be understood that the present invention defined by such claims is combined with the functions provided by variously listed means and with the ways that the claims require, so any means for providing the above functions should be understood to be equivalent to what can be recognized from the present specification.

The above-described objects, features and advantages could become clear with the aid of the following descriptions in relation with the accompanying drawings, and a person having ordinary skill in the art to which the present invention pertains can easily implement the technical concepts of the present invention. In addition, while the present invention is being described, if it is judged that the descriptions with respect to the known technology in relation with the present invention may make unclear the subject matters of the present invention, such detailed descriptions would be omitted.

Various embodiments of the present invention will be described with reference to the accompanying drawings.

FIG. 1 is a block diagram illustrating an electronic apparatus according to an embodiment of the present invention. Referring to FIG. 1, the electronic apparatus 100 includes part or all of a storing unit 110, an input unit 120, a line information generation unit 140, a lane position information generation unit 150, an AR provision unit 160, a control unit 170, a communication unit 180, and a sensing unit 190.

Here, the electronic apparatus 100 may be implemented using a smart phone, a tablet computer, a palm computer, a PDA (Personal Digital Assistant), a PMP (Portable Multimedia Player), a smart glass, a project glass, a navigation, a black box, etc. each of which may provide to a vehicle driver a driving-related information.

Here, the driving state of the vehicle may include, not limited to, a variety of states where the vehicle is being driven by a driver, for example, a stopping state of the vehicle, a running state of the vehicle, a parking state of the vehicle, etc.

The driving-related guide may include, not limited to, a variety of guides to assist the driving of a vehicle driver, for example, a road guide, a line departure guide, a forward vehicle starting guide, a signal change guide, a forward vehicle collision guide, a lane change guide, a lane guide, etc.

Here, the route guide may include, but limited to, an augmented reality road guide performing road guide by combining various information, for example, a user's position, direction, etc. with the images of the forward scenes of the currently driving vehicle, and a 2D (2-Dimensional) or 3D (3-Dimensional) road guide performing a road guide by combing the map data of the 2D or 3D with various information, for example, a user's position, direction, etc. Here, the route guide may be interpreted as an occasion wherein a driver drives on the vehicle as well as a concept including a road guide where a user moves walking or running.

In addition, the line departure guide may be a guide to guide whether the running vehicle departs from the line or not.

In addition, the forward vehicle start guide provides to guide whether or not a vehicle positioned in front of a vehicle which remains stopped, has started.

In addition, the signal lamp change guide provides to guide whether or not the signal lamp which positions in front of the vehicle which remains stopped, has changed. As an example, in a state where the red lamp representing the stop signal is on, when the lamp changes to the green lamp which means a start signal, such an operation may be guided.

In addition, the forward vehicle collision prevention guide provides to prevent any collision with the forward vehicle when the distance to the vehicle in front of the vehicle which remains stopped or runs is within a predetermined distance.

In addition, the lane change guide may a guide for guiding a change from the line where the vehicle is positioned to another line for the sake of a route guide to the destination.

In addition, the lane guide may be a guide for guiding the line where the vehicle is currently positioned.

The driving-related images which help various driving guide functions may be photographed in real time by the camera hung in the forward direction. Here the camera may be a camera which may be integrally formed with the electronic apparatus 100 hung in the vehicle so as to photograph the forward scenes of the vehicle. In this case, the camera may be integral with the smart phone, the navigation or the black box, and the electronic apparatus 100 may receive the images photographed by the integral camera.

As another example, the camera may be hung different from the electronic apparatus 100 and may photograph the forward scenes of the vehicle. In this case, the camera may be a separate black box which hung for the forward direction of the vehicle, and the electronic apparatus 100 may receive the photographed images according to a wired/wireless communication with the separately hung black box or may receive the photographed images when a storing medium for storing the photographed images of the black box is inserted in the electronic apparatus 100.

Hereinafter, the electronic apparatus 100 according to an embodiment of the present invention will be described in more details according to the above contents.

The storing unit 110 has a function for storing various data and applications which are necessary for the operations of the electronic apparatus 100. In particular, the storing unit 110 may store the data necessary for the operations of the electronic apparatus 100, for example, OS, a route search application, a map data, etc. In addition, the storing unit 110 may store the data generated by the operations of the electronic apparatus 100, for example, a searched route data, a received image, etc. In addition, the storing unit 110 may store a lane judgment table, etc.

Here, the storing unit 110 may be implemented using a built-in type storing element, for example, RAM (Random Access Memory), Flash Memory, ROM (Read Only Memory), EPROM (Erasable Programmable ROM) EEPROM (Electronically Erasable and Programmable ROM), a register, a hard disk, a removable disk, a memory card, USIM (Universal Subscriber Identity Module), etc. or a detachable type storing element, for example, a USB memory, etc.

The input unit 120 has a function for converting physical input from the outside of the electronic apparatus 100 into a specific electrical signal. Here, the input unit 120 may be all or part of a user input unit 121 and a microphone unit 123.

The user input unit 121 may receive a user's input, for example, a touch, a push operation, etc. Here, the user input unit 121 may be implemented using at least one among a various button types, touch sensor which receive touch inputs, and a near sensor for receiving an approaching motion.

The microphone unit 123 may receive a user's voice and sound from the inside or outside of the vehicle.

The output unit 130 is a device for outputting the data of the electronic apparatus 100. Here, the output unit 130 may be all or part of a display unit 131 and an audio output unit 133.

The display unit 131 is a device for outputting data that the electronic apparatus 100 may visually recognize. The display unit 131 may be implemented with a display unit provided at a front side of the housing of the electronic apparatus 100. Here, the display unit 131 is formed integral with the electronic apparatus 100 and may output a visual recognition data and is installed separate from the electronic apparatus 100 like the HUD and may output a visual recognition data.

The audio output unit 133 is a device for outputting the data that the electronic apparatus 100 may audibly recognize. The audio output unit 133 may be formed of a speaker which may output in the forms of sound the data which should be informed to the user of the electronic apparatus 100.

The communication unit 180 may provide to communicate with another device. The communication unit 180 may include, not limited to all or part of a position data unit 181, a wireless internet unit 183, a broadcast transceiver unit 185, a mobile communication unit 186, a local area communication unit 187 and a wired communication unit 189.

The position data unit 181 is a device for obtaining the position data through the GNSS (Global Navigation Satellite system). The GNSS means a navigation system which may calculate the position of the receiver terminal using radio signals from the satellite. As an example of the GNSS, there may, according to its operation body, be GPS (Global Positioning System), Galileo, GLONASS (Global Orbiting Navigational Satellite System), COMPASS, IRNSS (Indian Regional Navigational Satellite System), QZSS (Quasi-Zenith Satellite System), etc. The position data unit 181 of the electronic apparatus 100 according to an embodiment of the present invention may obtain a position data by receiving a GNSS signal which is served in a region where the electronic apparatus 100 is being used.

The wireless internet unit 183 is a device for connecting to the wireless internet, thus obtaining or transmitting the data. The wireless internet unit through the wireless internet unit 183 for connecting to the wireless internet may include, but not limited to, WLAN (Wireless LAN), Wibro (Wireless broadband), Wimax (World interoperability for microwave access), HSDPA (High Speed Downlink Packet Access), etc.

The broadcast transceiver unit 185 is a device for transmitting and receiving broadcast signals through various broadcast systems. The broadcast system for transmitting and receiving through the broadcast transceiver 185 may include, but not limited to, DMBT (Digital Multimedia Broadcasting Terrestrial), DMBS (Digital Multimedia Broadcasting Satellite), MediaFLO (Media Forward Link Only), DVBH (Digital Video Broadcast Handheld), ISDBT (Integrated Services Digital Broadcast Terrestrial), etc. The broadcast signal which may be transmitted or received through the broadcast transceiver unit 185 may include, but not limited to, a traffic data, a life data, etc.

The mobile communication unit 186 may communicate by connecting to a mobile communication network in compliance with various mobile communication criteria, for example, 3G (3rd Generation), 3GPP (3rd Generation Partnership Project), LTE (Long Term Evolution), etc.

The local area communication unit 187 is a device for the sake of a local area communication. The local area communication unit 187 may provide to communicate through Bluetooth, RFID (Radio Frequency Identification), infrared ray communication (IrDA, Infrared Data Association), UWB (Ultra WidBand), ZigBee, NFC (Near Field Communication), Wi-Fi, etc.

The wired communication unit 189 is an interface device for connecting the electronic apparatus 100 to another device through a wired connection. The wired communication unit 189 may be a USB module which may communicate through the USB port.

The communication unit 180 may communicate with another device using at least one of the position data unit 181, a wireless internet unit 183, a broadcast transceiver unit 185, a mobile communication unit 186, a local area communication unit 187, and a wired communication unit 189.

As an example, in case where the electronic apparatus 100 does not include a camera function, using at least one of the local area communication unit 187 and the wired communication unit 189, it is possible to receive the images taken by the vehicle camera, for example, a black box, etc.

As another example, in case where a communication is made to multiple devices, any one of them communicate with the local area communication unit 187, and the other one of them may communicate through the wired communication unit 189.

The sensing unit 190 is a device for detecting the current state of the electronic apparatus 100 and may include, but not limited to, all or part of a motion sensing unit 191 and a light sensing unit 193.

The motion sensing unit 191 may detect the motion in the 3D space of the electronic apparatus 100. The motion sensing unit 191 may be a 3-axis geomagnetic sensor and a 3-axis acceleration sensor. The motion data obtained by the motion sensing unit 191 is combined with the position data obtained by the position data unit 181, thus calculating a more accurate trace than the vehicle with the electronic apparatus 100.

The light sensing unit 193 is a device for measuring surrounding illuminance of the electronic apparatus 100 and allows to change the brightness of the display unit 131 to the surrounding brightness using the illuminance data obtained through the light sensing unit 193.

The power unit 195 is a device for supplying power which is necessary for the operation of the electronic apparatus 100 and the operation of another device connected to the electronic apparatus 100. The power unit 195 may be a device for receiving power from external power source, for example, a battery in the electronic apparatus 100 or a vehicle. In addition, the power unit 195 may, depending on the type for receiving power, be implemented in the form of a wired communication module 119 or a device for receiving power through a wireless connection.

Meanwhile, the control unit 170 control the whole operations of the electronic apparatus 100. In more detail, the control unit 170 may control all or part of the storing unit 110, the input unit 120, the output unit 130, the line information generation unit 140, the lane position generation unit 150, the AR provision unit 160, the communication unit 180 and the sensing unit 190.

In particular, the control unit 170 may control the line information generation unit 140 and the lane position information generation unit 150 to identify a line region from the driving-related image data, to generate a line information corresponding to the lane where the vehicle is located from the image data of the identified line region portion, and to generate a lane position information where the vehicle is located using at least one of the generated line information and the lane information of the road where the vehicle is located.

Here, the line may mean both lines which define a lane where the vehicle is located. The lane may be formed by the lines into the forms of a first lane, a second lane, . . . , N-th lane and may mean a road where the vehicle can run.

The line information generation unit 140 may identify a line region from the image data taken in a driving state, for example, a driving, stop, etc. of the vehicle, and generate a line information corresponding each line formed at both sides of the lane where the vehicle is located from the image data of the line region portion. The line information may include a line type information and a line color information each corresponding to each line formed at both sides of the lane where the vehicle is located.

Here, in order to generate a line information corresponding to the lane where the vehicle is located, the line information generation unit 140 may perform a binarization with respect to the image data of the line region portion and obtains a line type information from the binarized partial image data. In detail, the line information generation unit 140 analyzes the binarized partial image data using at least one of the time continuity information of the line and the line speed information, thus identifying whether or not the kinds of both the lines of the lane where the vehicle is located is a solid line or a dotted line.

In addition, the line information generation unit 140 may extract from an image data a color information corresponding to each line the kind of which was identified, thus generating a line information.

The lane position information generation unit 150 may generate a position information of a lane where the vehicle is located according to controlling of the control unit 170, using at least one of the line information generated by the line information generation unit 140 and the lane information of the road where the vehicle is located.

More specifically, the lane position information generation unit 150 may obtain a lane information of the road where the vehicle is located from the map data, and judges whether or not the vehicle is located on the first lane or the last lane of the road using the generated line information, and if the vehicle is located on the first lane or the last lane, generates a lane position information where the vehicle is located by reflecting the lane information of the road. Thereafter, if the lane where the vehicle is located changes to the lane next to the first lane or the last lane, due to the change of the lane of the vehicle, the generated lane position information may be updated using the changed lane position information. Thereafter, if the lane where the vehicle is located changes due to the change of the lane of the vehicle from the lane between them to the first lane or the last lane, a position information of a lane where the vehicle is located can be regenerated by reflecting the lane information of the road where the vehicle is located.

Here, the lane information of the road where the vehicle is located may include a lane count information of the road where the vehicle is located and a road type information (for example, an expressway, a city expressway, a regional road, a common road) and may be obtained from the map data stored in the storing unit 110 of the electronic apparatus 100, a database (DB) of an external map separate from the electronic apparatus 100, or another electronic apparatus 100. For example, if the electronic apparatus 100 is implemented in a form of a black box, the black box may provide to obtain a lane information of a road from an external navigation device which may be connected communicated.

Meanwhile, the lane information that each country uses are different. The lane position information generation unit 150 can generate position information using the lane judgment table in compliance with the traffic regulation, etc. by country. So, the lane position information may be generated according to the lane judgment table mapped on the country information set by the lane position information generation unit 150.

Meanwhile, the control unit 170 may perform the driving-related guide of the vehicle using the line information generation unit 140 and the lane position information generation unit 150.

As an example, the control unit 170 may select an appropriate line departure guide according to the type of the line, formed at both sides of the lane where the vehicle is located, which is identified on basis of the line information and may output to the user. In detail, the control unit 170, if the electronic apparatus 100 provides a line departure guide function, may provide different guides according to the line type and color of the departed line. For example, the control unit 170 may select and output different guide images or guide voices according to whether or not the vehicle has intruded the central line, has intruded the white solid line, has intruded the white dotted line or has intruded the blue line.

As another example, the control unit 170 may output the generated line guide through the output unit 140 using the lane position information generated by the lane position information generation unit 150. In detail, the control unit 170 may output which number the vehicle is located on, for example, the recognition of the first lane, the second lane, . . . , the N-th lane, in a form of image or voice.

As further another example, the control unit 170 may output the generated lane change guide through the output unit 140 using the lane position information generated by the lane position information generation unit 150. In detail, the control unit 170, if the electronic apparatus 100 provides a navigation function of the vehicle, may output in a form of image or guide voice the lane change guide based on the route to the destination and the judged lane position. Namely, the control unit 170 may judge whether or not the current lane is allowed for the left turn or the right turn if the distance to the left turn or right turn guide spot is less than a predetermined distance and outputs a lane change guide to the user.

Meanwhile, the control unit 170 may control the AR provision unit 160 for the electronic apparatus 100 to perform the driving-related guide based on the AR. Here, the AR may be a way to visually show in duplicate the added information (for example, a graphic component which represents the point of interest (POI), a graphic component which represents the route to the destination, etc.) on the screen which contains the real world that the user is actually seeing. In this case, the control unit 170 may generate an indicator for performing the driving-related guide in cooperation with the AR provision unit 160 and may output the generated indicator through the output unit 130. the augmented reality may be provided using the HUD which uses the wind shield of the vehicle or an image overlay which uses a separate image output device. The augmented reality provision unit 160 may generate a real image and an interface image, etc. which overlaps on the glass. Based on the above features, it is possible to implement an augmented reality navigation or a vehicle infortainment system.

In particular, according to an embodiment of the present invention, a route guide indicator may be constructed in real time, which is proper to the AR through the 3D process of the route guide line. It is possible to effectively display a 3D route guide indicator on the camera image of the 2D, thus providing a reality-like indicator, which will be described later in more detail.

Figure 2:
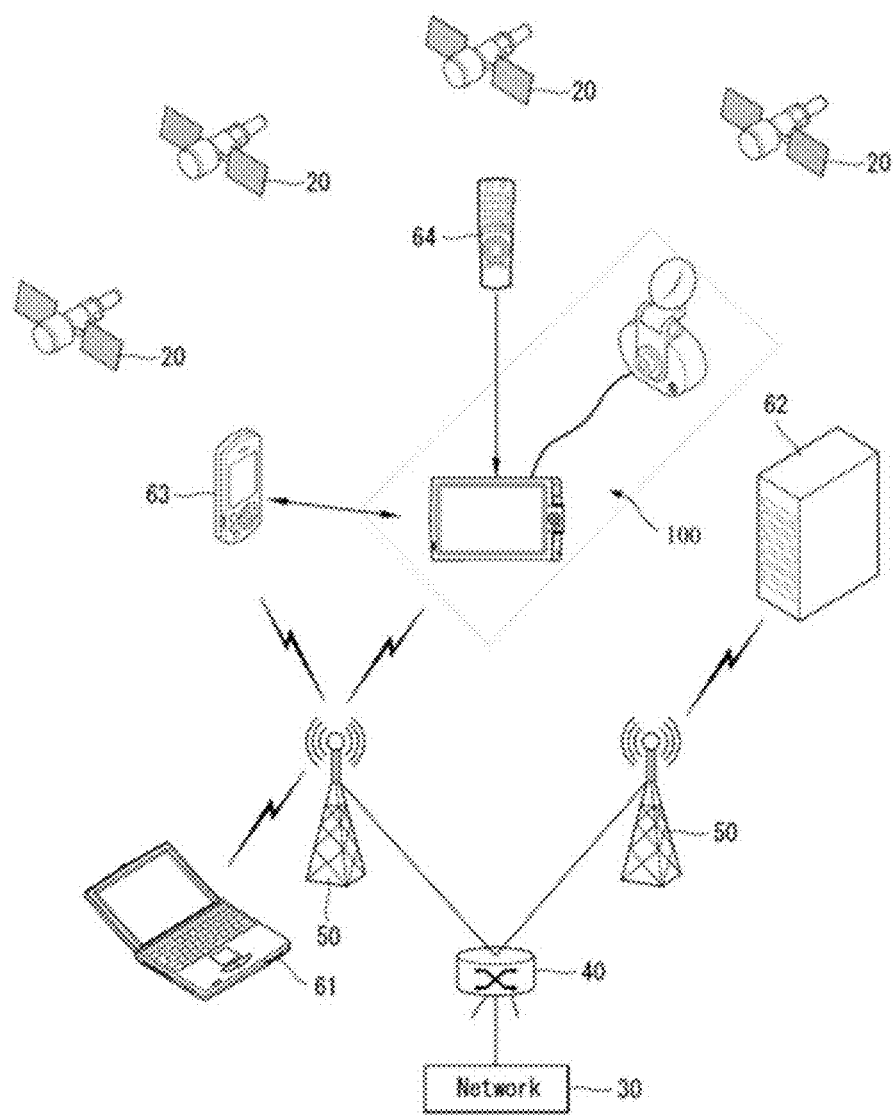
FIG. 2 is a view for describing a system network connected to an electronic apparatus according to an embodiment of the present invention.

FIG. 2 is a view for describing a system network which is connected to another electronic apparatus according to an embodiment of the present invention. Referring to FIG. 2, the electronic apparatus 100 of an embodiment of the present invention may be implemented using various devices provided in the vehicle, for example, a navigation, a black box, a smart phone or other vehicle AR interface provision device and may be connected with various communication networks and other electronic devices 61 to 64.

In addition, the electronic apparatus 100 may calculate the current position and current timing in cooperation with a GPS module in accordance with a radio signal from the satellite. Each satellite 20 may transmit or receive L-band frequencies the frequency bands of which are different. The electronic apparatus 100 may calculate the current position according to the time which has lapsed until the L-band frequency from each satellite 20 reaches the electronic apparatus 100.

Meanwhile, the electronic apparatus 100 may connect to the network 30 in a wireless way through the communication unit 180 and through the control station 40 (ACR) and the base station 50 (RAS). When the electronic apparatus 100 gets connected to the network 30, it may indirectly connected to the electronic devices 61 and 62, thus exchanging the data.

Meanwhile, the electronic apparatus 100 may indirectly connect to the network 30 through another device 63 which has a communication function. For example, in case where the electronic apparatus 100 is not equipped with a module which may connect to the network 30, it is possible to communicate with another device 63 which has a communication function through the local area communication module.

Figure 3:
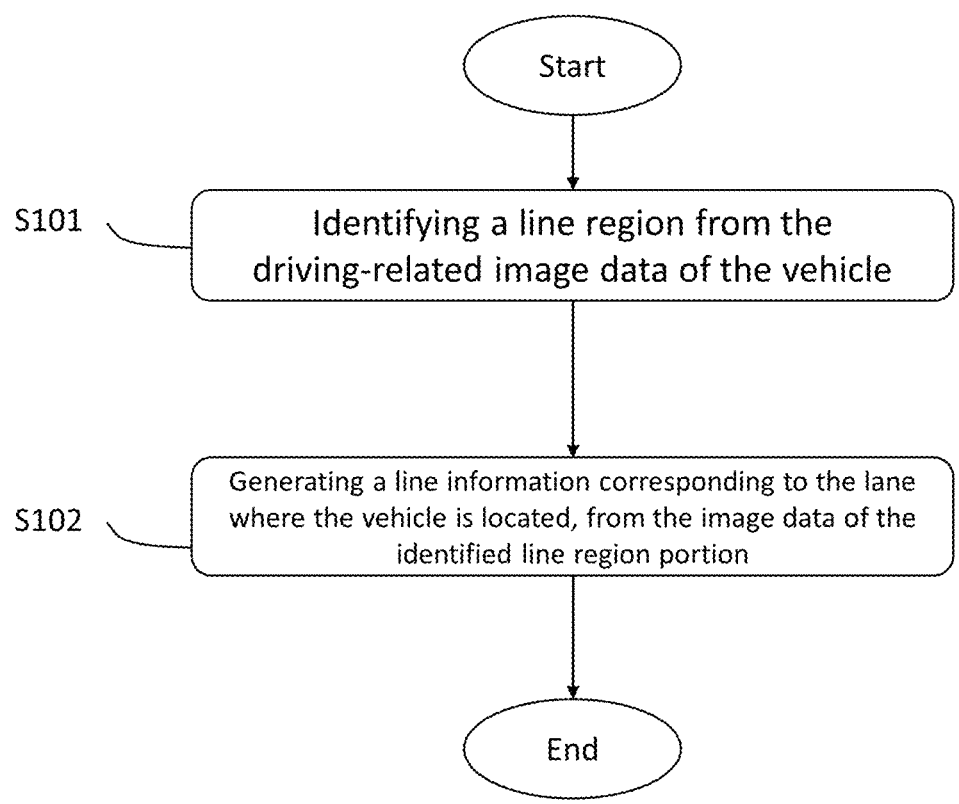
FIG. 3 is a flow chart for describing a line information generation method of an electronic apparatus according to an embodiment of the present invention.

FIG. 3 is a flow chart for describing a line information generation method of an electronic apparatus according to an embodiment of the present invention. Referring to FIG. 3, the electronic apparatus 100 may identify a line region from the driving-related image data of the vehicle (S101). In more detail, the line information generation unit 140 may convert a driving-related image into a gray image and determine as a line region which is formed at both sides of a vehicle by performing a line detection algorithm. Here, the driving-related image of the vehicle may include the images related to a stop, a running, etc. of the vehicle. In addition, the driving-related image of the vehicle may be an image taken by a camera module of the electronic apparatus 100 or an image that the electronic apparatus 100 has received from another device. In addition, the driving-related image of the vehicle may be RGB (Red, Green, Blue) colors.

In addition, the electronic apparatus 100 may generate a line information corresponding to the lane where the vehicle is located from the image data of the identified line region portion (S102). In detail, the line information generation unit 140 may generate a line information by analyzing the pattern information and color information of the line with respect to the detected line region. The line information may include at least one of the line type information and the line color information which correspond to each line positioned at both sides of the lane where the vehicle is located.

Hereinafter, the line information generation method will be described in detail with reference to FIGS. 4 to 7.

Figure 4:
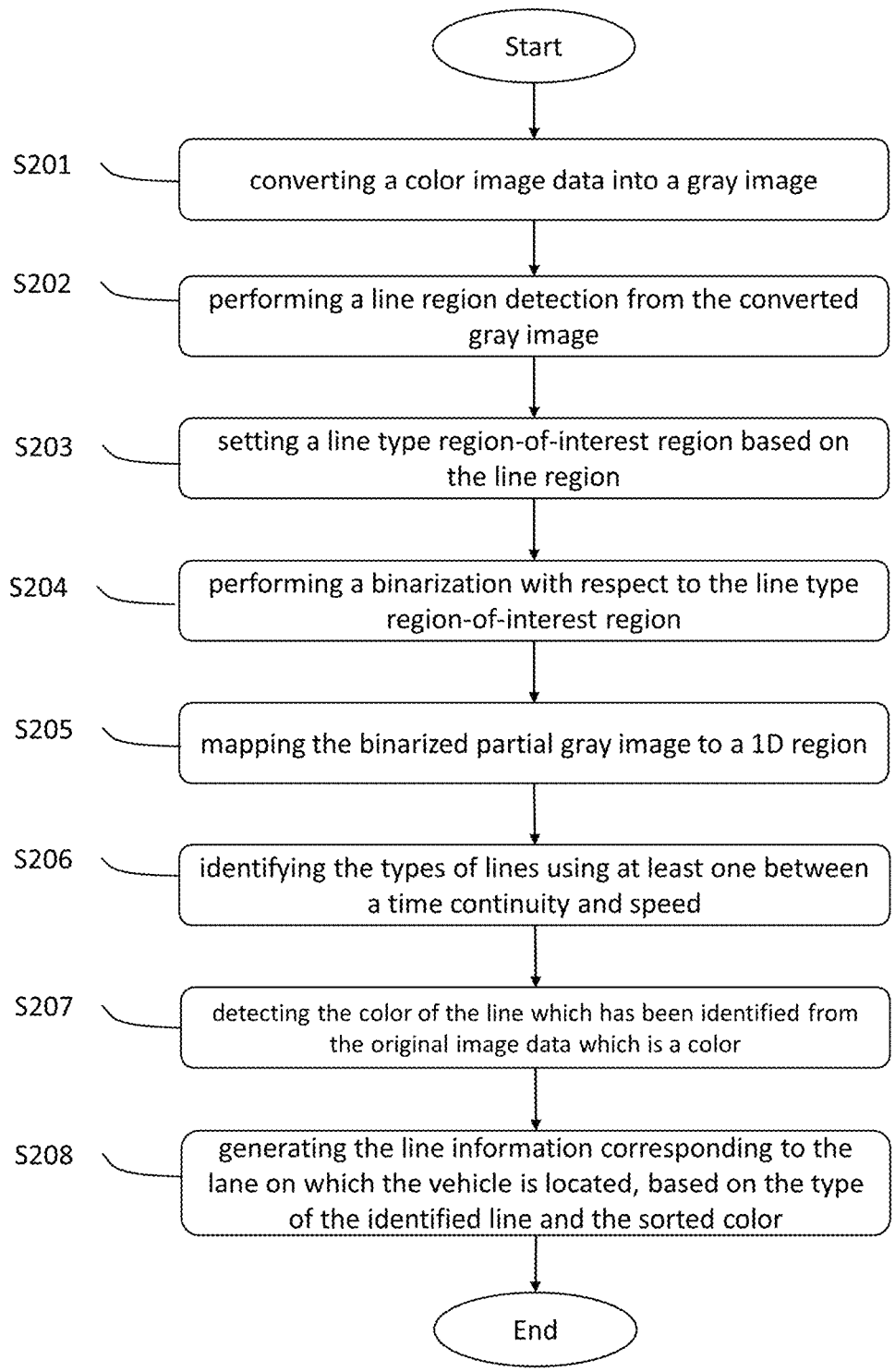
FIG. 4 is a flow chart for describing in detail a line information generation method of an electronic apparatus according to an embodiment of the present invention.

FIG. 4 is a flow chart for describing in detail the line information generation method of the electronic apparatus according to an embodiment of the present invention. Referring to FIG. 4, the electronic apparatus 100 may convert a color image data into a gray image (S201), and may perform a line region detection from the converted gray image (S202).

In more detail, the line information generation unit 140 may extract a region for detecting lines from the photographed driving-related images. Also, the line information generation unit 140 may previously perform a light source compensation with respect to the original image in order to minimize any shadow effects since it is hard to detect lines if part of the road is affected by the shadow.

And, the line information generation unit 140 may detect as a line region the region where the line may exist based on the previously determined position of the camera or the installation angle of the camera. As an example, the line information generation unit 140 may determine the line region about a position where the line may begin. In addition, the line information generation unit 140 may estimate the position where the line region begins and the length of the line region as the width (the maximum width between the left line region and the right line region) in the driving-related image and the viewing angle of the camera.

Also, the line information generation unit 140 may convert the gray image corresponding to the line detection region into an edge image and may detect the line region based on the straight position extracted from the converted edge image. More specifically, the driving-related image may be converted into an edge image through various known algorithms. The edge image may include an edge which shows multiple straight lines. At this time, the line information generation unit 140 may recognize as a line the detected straight line. Also, the line information generation unit 140 may determine the line region based on the position of the straight line which has the width of a constant line width with respect to the running direction of the vehicle among multiple straight line candidates.

Figure 5:
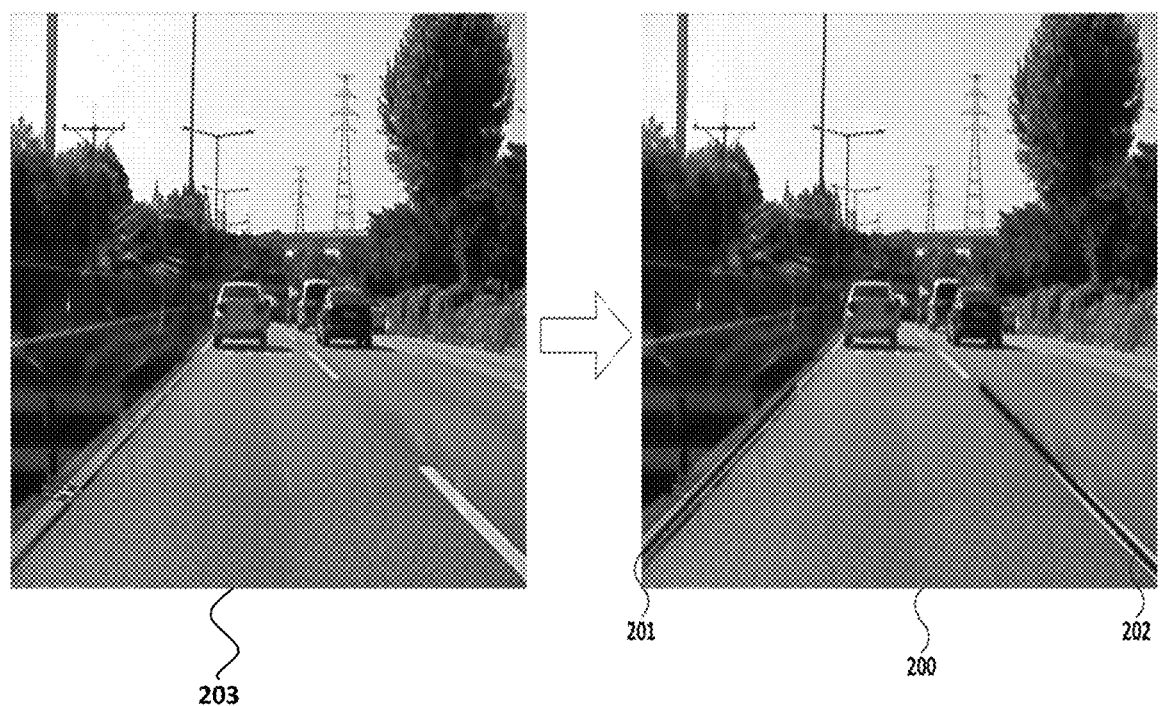
FIG. 5 is a view illustrating a gray image conversion and a line region detection procedure according to an embodiment of the present invention.

FIG. 5 shows the above gray image conversion and the line region detection procedure. Referring to FIG. 5, the inputted driving-related color image 203 may be converted into a gray image 200, and line regions 201 and 202 of a straight line may be detected through a line detection algorithm of an edge detection, etc. The line region may be categorized into a left line region 201 and a right line region 202 about the position of the vehicle.

Turning back to FIG. 4, it will be described.

Thereafter, if the line region is detected, the line information generation unit 140 may set a line type region-of-interest region based on the line region (S203). In detail, if the line region is detected, the line information generation unit 140 may set a line type region-of-interest region (ROI) according to the detected line region. The line type region-of-interest region may mean the portion of the driving-related image which includes the line and its surrounding region so as to judge the types and colors of the lines.

Figure 6:
FIG. 6 is a view illustrating a line type interested region in a gray image according to an embodiment of the present invention.

More specifically describing, FIG. 6 shows a line type region-of-interest in the gray image.

As illustrated in FIG. 6, the line type region-of-interests 210 and 220 may partially include the previously detected line region and its peripheral region. In addition, the line type region-of-interest may be categorized about the proceeding direction of the vehicle into a left line type region-of-interest 210, and a right line type region-of-interest 220.

As an example, if the detected line region is formed like a linear line and is expressed like y=a*x+b, the line type region-of-interest may be a region including both y=a*x+b+m and y=a*x+b−m. Different from a conventional simple line detection method, as a method for generating detailed and various running line information, the line information generation unit 140 expands the line region of the detected straight line and may set its peripheral region as a region-of-interest.

Turning to FIG. 4, it will be described.

Thereafter, the line information generation unit 140 performs a binarization with respect to the line type region-of-interest region (S204) and maps the binarized partial gray image to a 1D region (S205) and can identify the types of lines using at least one of the time continuity and speed (S206).

The line information generation unit 140 may extract a partial gray image of the line type region-of-interest region from the converted gray image and performs a binarization with respect to the partial gray image. So, the line information generation unit 140 can clearly distinguish only the portion judged to be a line, from the partial gray image.

And, the line information generation unit 140 can map, to a 1D region, each line (left line and right line) which can be recognized in the binarized partial gray image. In addition, the types of lines can be identified by analyzing the pattern of each line mapped to the 1D region.

Figure 7:
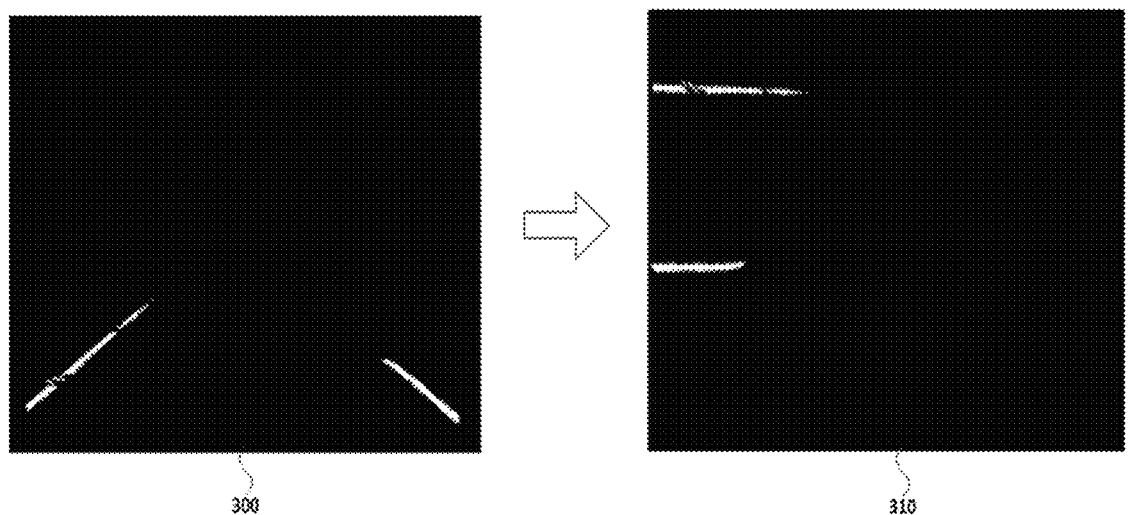
FIG. 7 is a view depicting a line type region-of-interest binarization and a 1-dimensional mapping in a gray image according to an embodiment of the present invention.

In more detail, FIG. 7 depicts a line type region-of-interest binarization and a 1D mapping in the gray image.

As depicted in FIG. 7, if a binarization with respect to the line type region-of-interest is performed, a binarized image 300 may be obtained. In the binarized image 300, the portion appearing in white may be identified as a line, the other portions may be identified as black.

And, each line identified in the binarized image 300 may be mapped to a 1D region. The line information generation unit 140 may easily identify the types of lines using the image 310 mapped to the 1D region.

For example, the line information generation unit 140 may judge the dotted line or solid line based on the start point and length feature of each line mapped to the 1D. Also, the line information generation unit 140 may judge the dotted line or solid line using continuity with respect to time of each line mapped to the 1D and using the speed. And, the line information generation unit 140 firstly determines the dotted line or solid line based on the start point and length feature and then secondarily determines the dotted line or solid line using the time continuity and speed.

More specifically, the line information generation unit 140 may determine the dotted line or solid line by comparing and judging the line length based on the position of the start point of each line. In this case, the line information generation unit 140 may judge the dotted line or solid line using one image frame.

Also, the line information generation unit 140 may clearly judge if a line is a dotted line or a solid line depending on whether each line is continuously formed or not as time passes (S206). As an example, the line information generation unit 140 may previously sets a continuity level according to the moving speed of the line in the image and may judge as a dotted line if the continuity of each line is lower than the value of a previously set continuity level.

Therefore, according to the embodiment of the present invention, the dotted line or the solid line is previously identified using one frame, and such identification can be proved using a continuous frame, thus finally judging the type of line.

Referring back to FIG. 4, the electronic apparatus 100 may detect a color of a line portion the type of which has been identified, from the colorful original image data (S207).

The line information generation unit 140 may detect the color at a portion corresponding to the line the type of which has been identified, by analyzing a color image and sorts the same. As an example, the line information generation unit 140 can sort the detected color into white, yellow or blue.

Thereafter, the electronic apparatus 100 may generate a line information corresponding to the lane where the vehicle is located according to the identified line type and classified color (S208).

Figure 8:
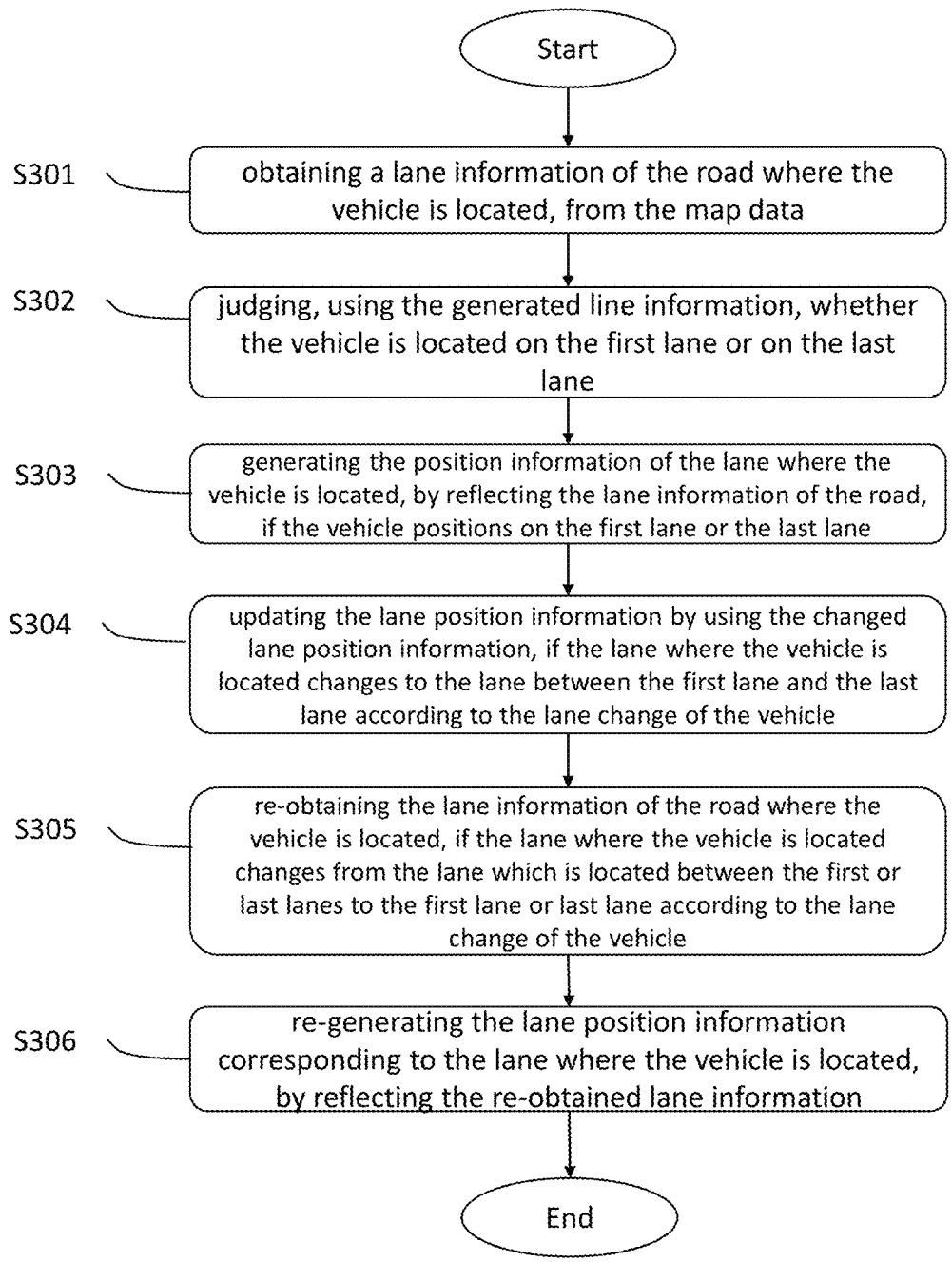
FIG. 8 is a flow chart depicting in detail a lane position information generation method according to an embodiment of the present invention.

FIG. 8 is a flow chart depicting in detail the method for generating a lane position information according to an embodiment of the present invention. Referring to FIG. 8, the electronic apparatus 100 can obtain a lane information of the road where the vehicle is located, from the map data (S301). Here, the lane information of the road may be a lane information of the road where the running vehicle is currently located or may include an information on the number of the lanes of the road where the vehicle is located. In addition, the lane information of the road may be obtained from the map data stored in the storing unit 110 in the electronic apparatus 100 or may be obtained from an external map database (DB) being separate from the electronic apparatus 100 or may be obtained from another electronic apparatus 100.

And, the electronic apparatus 100 may judge, using the generated line information, whether the vehicle is located on the first lane of the road or on the last lane (S302). More specifically, the lane position information generation unit 150, as depicted in FIG. 9, judges whether the vehicle is located on the first lane of the road or on the last lane of the road by reflecting the line information corresponding to the lane in the lane judgment table.

Namely, the lane judgment table may contain the first lane and the last lane which are determined according to the nation, the line types and colors of the left line, the types and colors of the right line. Here, the lane judgment table as depicted in FIG. 10 may be provided as examples, and may be set as different values depending on nations or situations for each setting.

Meanwhile, the electronic apparatus 100 may generate the position information of the lane where the vehicle is located by reflecting the lane information of the road, if the vehicle is located on the first lane or the last lane (S303). As an example, if it is judged that the vehicle is in the last lane, the lane position information generation unit 150 may generate the lane position information as a N-lane. In addition, if the number of the lanes corresponding to the road lane information is 5, the N-lane may be generated into 5th lane based on the above principle.

And, the electronic apparatus 100 may update the lane position information by using the changed lane position information, if the lane where the vehicle is located changes to the lane between the first lane and the last lane according to the lane change of the vehicle (S304). In this case, the lane position information generation unit 150 may judge the departing of the line by using the line information and judges the changes of the lane based on the above judgment. As an example, the lane position information generation unit 150 may update the lane position information from the 5th lane to the 4th lane if it is judged that the vehicle has changed from the 5th lane to the left side lane, which means the lane change by one lane.

And, the electronic apparatus 100 may obtain again the lane information of the road where the vehicle is located, if the lane where the vehicle is located changes from the lane which is located between the first or last lanes to the first lane or last lane according to the lane change of the vehicle (S305). In addition, the lane position information generation unit 150 may re-generate the lane position information corresponding to the lane where the vehicle is located, by reflecting the re-obtained lane information (S306). As an example, if it is judged that the vehicle changes from the 4th lane to the right side lane, which means the change by one lane, the vehicle has changed to the 5th lane which is the previously set last lane, thus obtaining the lane information of the road where the vehicle is currently located. In addition, if an obtained lane information is the 4th lane, the position information of the lane where the vehicle is located may be re-generated as the 4th lane.

Meanwhile, the lane position information generation method according to an embodiment of the present invention is not limited to FIG. 9. Therefore, the above-described sequences may change according to another embodiment. As an example, the step wherein the lane information of the road where the vehicle is located may be obtained in the step S304. In this case, the lane position information generation unit 150 may generate the position information of the lane where the vehicle is located if the vehicle is located on the first or last lane. As an example, if it is judged that the vehicle is located on the last lane, the lane position information generation unit 150 can generate the lane position information as the N-lane.

And, the electronic apparatus 100 may update the lane position information using the generated lane position information and the obtained lane information of the road, if the lane where the vehicle is located changes to the lane which is located between the first or last lanes according to the lane change of the vehicle (S304). As an example, the lane position information generation unit 150 may update the lane position information to the 4th lane in such a manner to reflect N=5 which is the information corresponding to the number of lanes to the N–1 lane if it is judged that the vehicle has changed from the N-lane corresponding to the last lane to the left lane, which means the change by one lane.

And, according to another embodiment of the present invention, the lane position information generation unit 150 may judge if the vehicle is located on the first lane, the center lane or the last lane of the road by applying the line information corresponding to the lane where the vehicle is located to the lane judgment table as depicted in FIG. 10. However, in this case, it is hard to accurately know the lane where the vehicle is located among the multiple center lanes if the center lane of the road is provided multiples in number (for example, the number of lanes is 4 or more than 4). The embodiment of the present invention may preferably use the method as depicted in FIG. 9.

Figure 11:
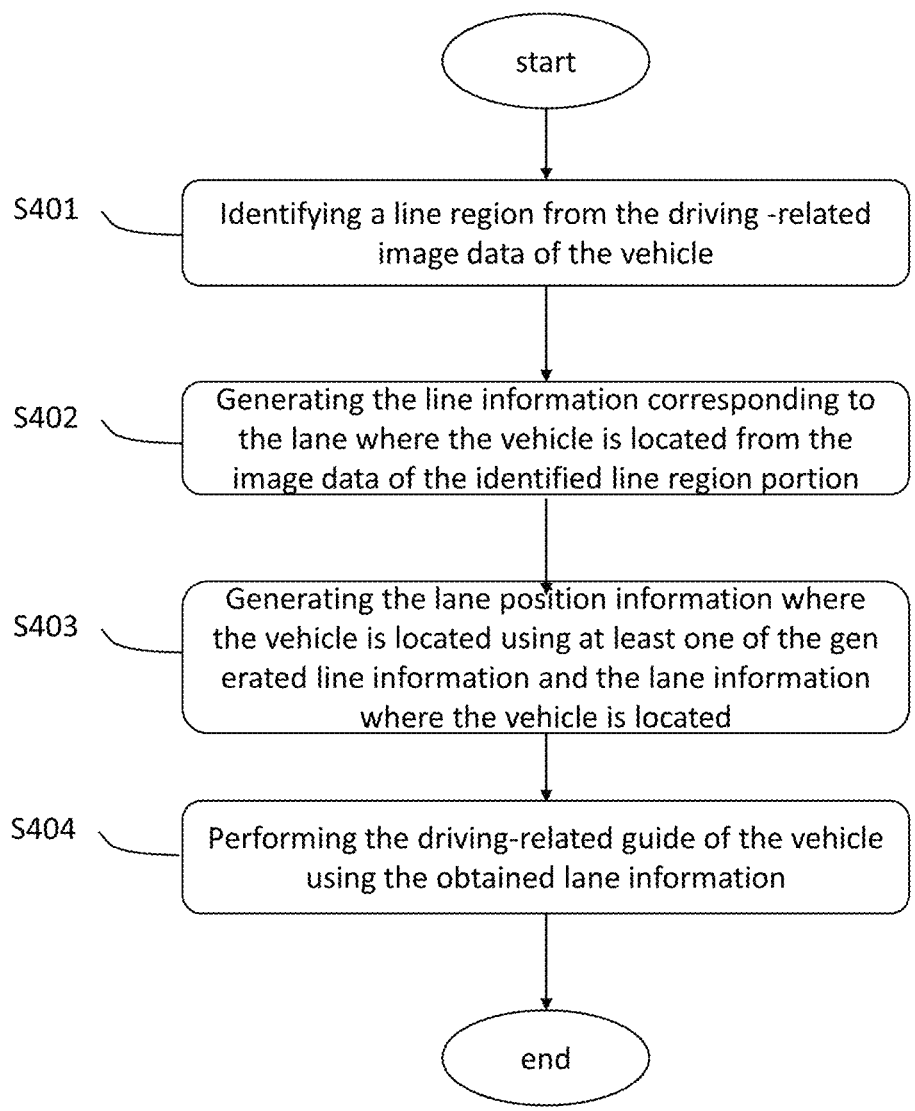
FIG. 11 is a flow chart for describing a control method according to an embodiment of the present invention.

FIG. 11 is a flow chart for describing a control method according to an embodiment of the present invention. Referring to FIG. 11, the electronic apparatus 100 may identify a line region from the driving-related image data of the vehicle (S401).

In addition, the line information corresponding to the lane where the vehicle is located may be generated from the image data of the identified line region portion (S402).

In addition, the lane position information where the vehicle is located may be generated using at least one of the generated line information and the lane information of the road where the vehicle is located (S403).

In addition, the driving-related guide of the vehicle may be performed using the obtained lane information (S404).

Here, the step S404 for performing the driving-related guide of the vehicle may include outputting a lane change guide using the navigation route of the vehicle and the lane position information.

In addition, the step S404 for performing the driving-related guide of the vehicle may include outputting a lane guide where the vehicle is located using the lane position information.

Meanwhile, the control method of an embodiment of the present invention may include selecting and outputting an appropriate line departure guide according to the type of the line at both sides of the lane of the vehicle recognized based on the line information.

Here, the outputting may be performed by generating an indicator for performing the driving-related guide and outputting the generated indicator through the AR.

Meanwhile, the conventional AR navigation uses various techniques in terms of the route guide, but there is a limit to express the route guide due to a problem in mixing the route guide line and the actual road environment.

However, according to an embodiment of the present invention, an appropriate route guide indicator matching with the AR can be constructed in real time based on the 3D processing of the route guide line, thus effectively expressing 3D route guide indicator, which looks like reality, on the 2D camera images. The AR provision unit 160 according to an embodiment of the present invention for achieving the above objects will be described in detail below.

Figure 12:
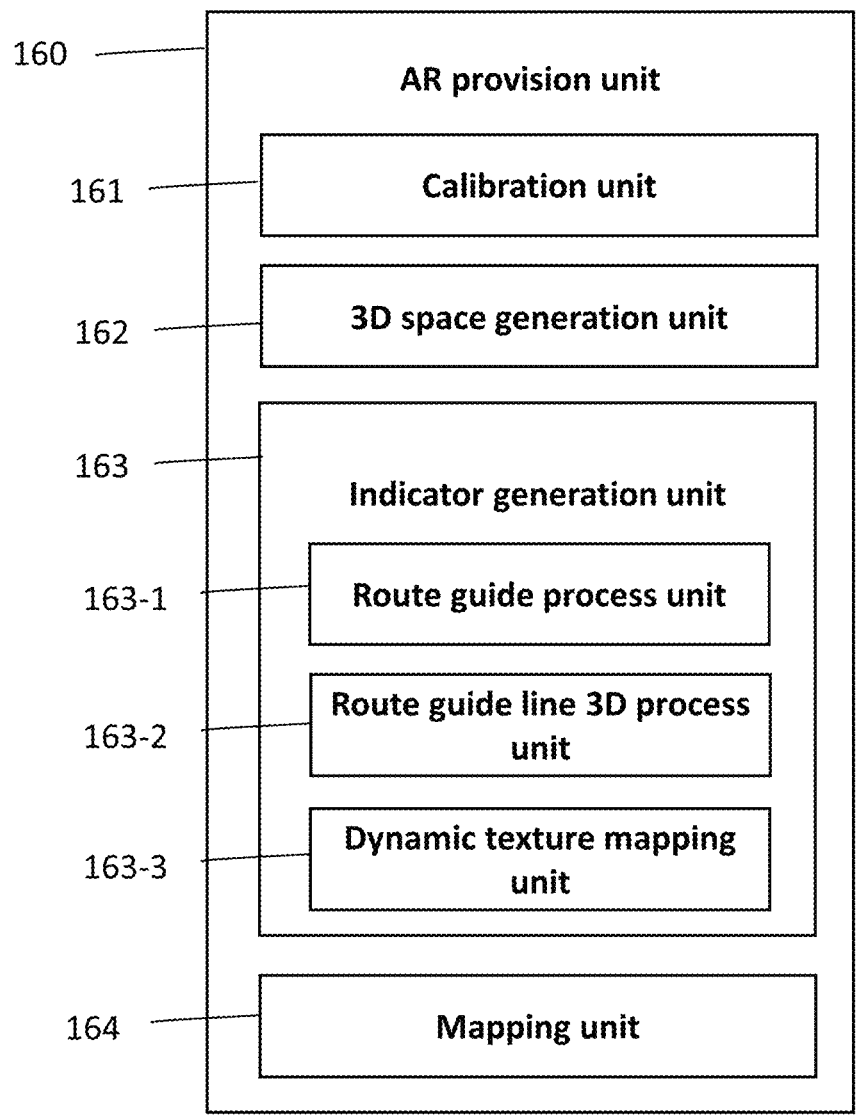
FIG. 12 is a bloc diagram illustrating in detail an AR provision unit according to an embodiment of the present invention.

FIG. 12 is a block diagram illustrating in detail the AR provision unit 160 according to an embodiment of the present invention. Referring to FIG. 12, the AR provision unit 160 may include a part of all of a calibration unit 161, a 3D space generation unit 162, an indicator generation unit 163, and a mapping unit 164.

The calibration unit 161 may perform calibrations for estimating a camera parameter corresponding to the camera from the photographed images taken by the camera. Here, the camera parameter may be a parameter which forms a camera matrix which is an information showing a relationship between a real space and a photo.

The 3D space generation unit 162 may generate a virtual 3D space based on the photographed images taken by the camera. In detail, the 3D space generation unit 162 may obtain a depth information from the image taken by the camera based on the camera parameter estimated by the calibration unit 161 and may generate a virtual 3D space based on the obtained depth information and the photographed image.

The indicator generation unit 163 may generate an indicator for guides in the AR reality, for example, a route guide indicator, a lane change guide indicator, a line departure guide indicator, etc.

In particular, when a user input requesting a route guide to the destination is received through the input unit 120, the indicator generation unit 163 may generate a route guide indicator for a route guide on the AR. Here, the route guide indicator generation unit may include a route guide line process unit 163-1, a route guide line 3D process unit 163-2 and a dynamic texture mapping unit 163-3.

When a route guide line to the destination is generated at a user's route guide request, the route guide line process unit 163-1 may perform the processing of a route guide line by reflecting a running trace radius of an actual running vehicle.

In detail, the electronic apparatus 100 may generate a route guide line to the destination by using a map data obtained from the storing unit 110, or a map data obtained from an external map database (DB) which is separate from the electronic apparatus 100. Here, the generated route guide line may be formed of a node and a link, as depicted on the left side of FIG. 13. Referring to the left side of FIG. 13, the generated route guide line 1301 may be a straight line which is not similar with the vehicle running trace of an actual running vehicle in the curve section 1302. if the generated route guide line 1301 is mixed with the camera images to provide AR the result of AR screen is different from the running trace of the actual running vehicle.

Therefore, the route guide line process unit 163-1 according to an embodiment of the present invention may perform the processing of a route guide line by reflecting the running trace radius of the actual running vehicle. In detail, the route guide line process unit 163-1 may remove a vertex with respect to the region not shown on the current screen among the generated route guide lines, and any unnecessary vertex like a duplicate spot. In addition, the route guide line process unit 163-1 may add vertexes to the user's vehicle front section of the route guide line so as to form the user's vehicle front section of the route guide line as a straight line. In addition, the route guide line process unit 163-1 may add vertexes to the curve section of the route guide line so as to form the curve section of the route guide line as a curve line. In addition, the route guide line process unit 163-1 may generate the route guide line to which the running trace of an actually running vehicle has been reflected, by using the added vertexes.

Figure 13:
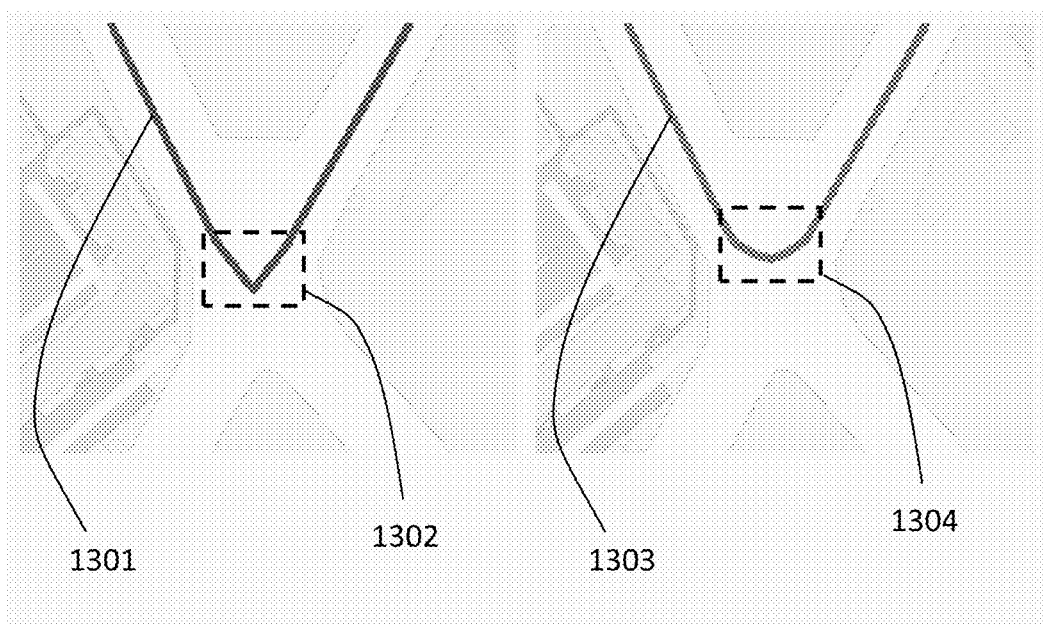
FIG. 13 is a view illustrating a comparison before and after a treatment of a route guide line.

According to an embodiment of the present invention, the route guide line may be generated, as depicted on the right side of FIG. 13. Referring to the right side of FIG. 13, the processed route guide line 1303 may be a smooth type which is similar with the vehicle running trace of an actual running vehicle in the curve section 1304.

The route guide line 3D process unit 163-2 may perform a variable 3D process with respect to the route guide line generated by the route guide line process unit 163-1 while changing the height based on its distance. The above operation will be described in detail with reference to FIG. 14.

Figure 14:
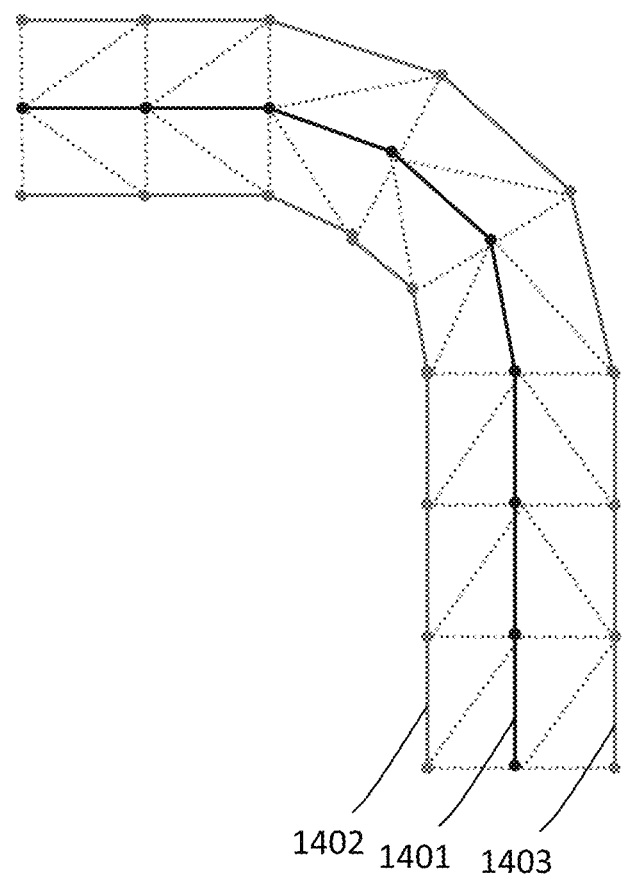
FIG. 14 is a view illustrating a routine guide line 3D process according to an embodiment of the present invention.

Referring to FIG. 14, the route guide line 3D process unit 163-2 may generate virtual route guide lines 1402 and 1403 at both sides of the route guide line 1401 that is generated by the route guide line process unit 163-1. In detail, the route guide line 3D process unit 163-2 may calculate a unit vector of the vertex of the route guide line 1401 generated by the route guide line process unit 163-1 and may calculate a normal vector which is vertical to the unit vector based on the internal computation of the calculated unit vector, thus generating virtual route guide lines 1402 and 1403.

In addition, the route guide line 3D process unit 163-2 may calculate the height values of the vertexes included in the route guide line 1401. In this case, the route guide line 3D process unit 163-2 may calculate the height values of the vertexes contained in the route guide line 1401 to increase in proportion to the distance to the user's vehicle.

In addition, the route guide line 3D process unit 163-2 may generate, through polygonization, surfaces with respect to the vertexes of the route guide line 1401 the height value of which has been calculated, and the vertexes included in the virtual route guide lines 1402 and 1403, thus performing a 3D process.

Therefore, the route guide indicator at the spot which is far from the user's vehicle among the route guide indicator displayed on the screen may be displayed on the screen so that the driver can recognize.

The dynamic texture mapping unit 163-3 may map the textures having a displacement based on the speed of the vehicle onto the 3D data generated by the route guide line 3D process unit 163-2.

Here, the textures may be textures having a displacement based on the speed of the vehicle. Namely, if the vehicles moves along the route, the dynamic texture mapping unit 163-3 may generate a texture having a displacement based on the speed of the vehicle by changing the mapping position of the texture in the 3D data. In this case, the route guide indicator displayed on the screen may allow to maximize the effects, for example, looking like sticking on the surface of the road.

Through this operation, the indicator generation unit 163 may generate a route guide indicator for the route guide on the AR.

Meanwhile, in the display technique which, assuming that there is a turn point, in general is used after a turn point assuming, for the sake of a more effective screen display, the route guide line 3D process unit 163-2 may make vertical the 3D images generated based on the above operations.

Namely, in case of the left turn, the route guide line 3D process unit 163-2 may determine the 3D data by erecting in the height direction the virtual route guide line 1403 corresponding to the right side of the route guide line 1401. On the contrary, in case of the right turn, the 3D data may be determined by erecting in the height direction the virtual route guide line 1402 corresponding to the left side of the route guide line 1401.

Meanwhile, the mapping unit 164 may combine the indicator generated by the indicator generation unit 163 with the virtual 3D space generated by the 3D space generation unit 162.

Figure 15:
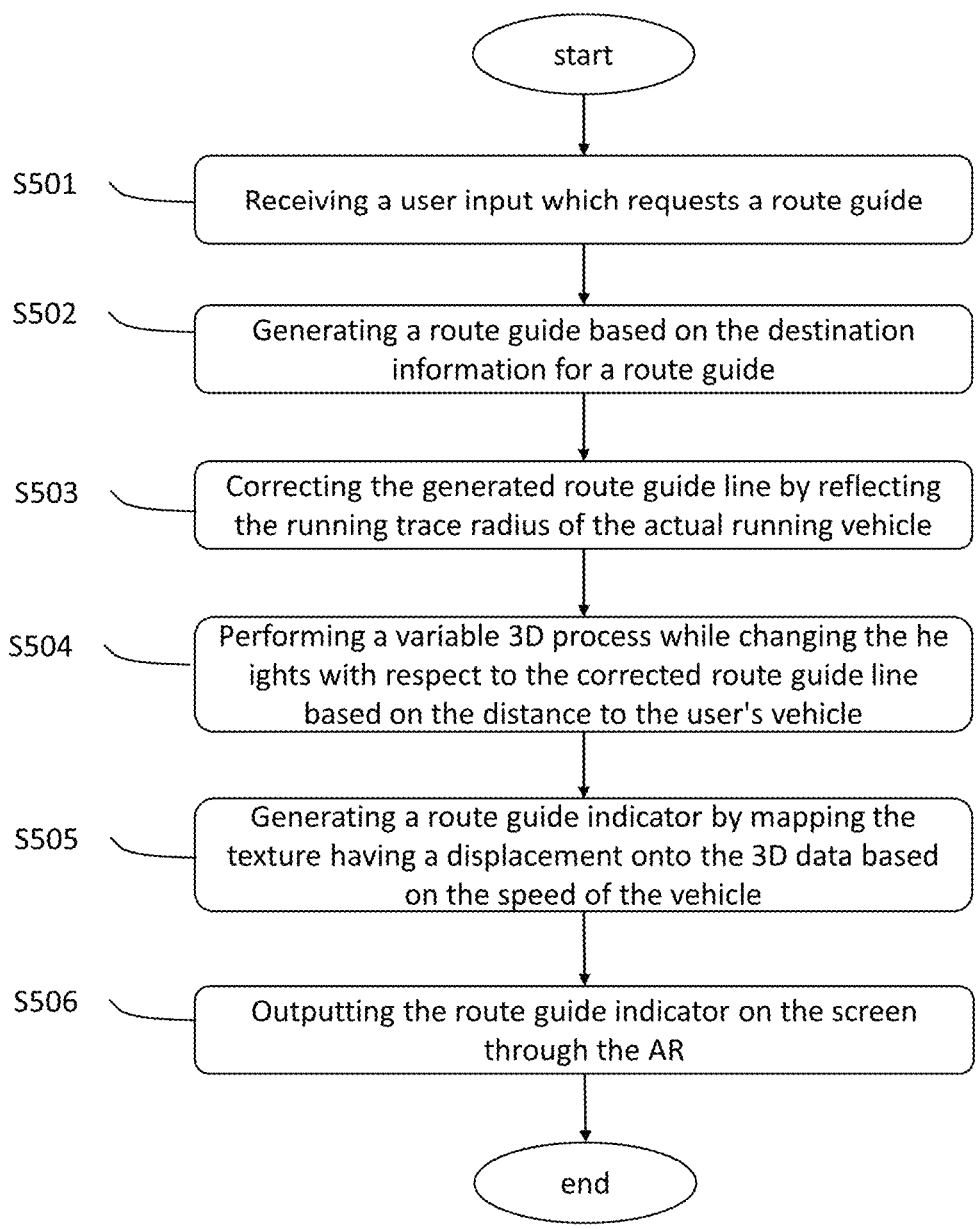
FIG. 15 is a flow chart for describing an AR route guide method according to an embodiment of the present invention.

FIG. 15 is a flow chart illustrating an AR (Augmented Reality) route guide method according to an embodiment of the present invention. Referring to FIG. 15, the electronic apparatus 100 may receive a user input which requests a route guide (S501).

In addition, the electronic apparatus 100 may generate a route guide line based on the destination information for a route guide (S502).

In addition, the electronic apparatus 100 may correct the generated route guide line by reflecting the running trace radius of the actual running vehicle (S503). In detail, the step S503 may include a step wherein the vertex with respect to the region not shown on the current screen among the generated route guide line and the unnecessary vertex like a duplicate spot are removed, the vertexes for maintaining a straight line of the route guide line the user's vehicle are added to the user's vehicle front section, a step wherein the vertexes for a curve formation are added to the curve section of the route guide line, and a step wherein a route guide line to which the running trace radius of the actually running vehicle is reflected, is generated using the added vertexes.

In addition, the electronic apparatus 100 may perform a variable 3D process while changing the heights with respect to the corrected route guide line based on the distance to the user's vehicle (S504). In detail, the step S504 may include a step wherein a virtual route guide line is generated at both sides of the processed route guide line, a step wherein the height values are calculated for the height values of the vertexes contained in the processed route guide line to increase in proportion to the distance, and a step for generating, through polygonization, surfaces with respect to the vertexes of the route guide line the height value of which has been calculated, and the vertexes included in the virtual route guide lines, thus performing a 3D process.

In addition, the electronic apparatus 100 may generate a route guide indicator by mapping the texture having a displacement onto the 3D data based on the speed of the vehicle (S505).

In addition, the electronic apparatus 100 may output the route guide indicator on the screen through the AR (S506). Here, the output screen will be described in detail with reference to FIG. 16.

Figure 16:
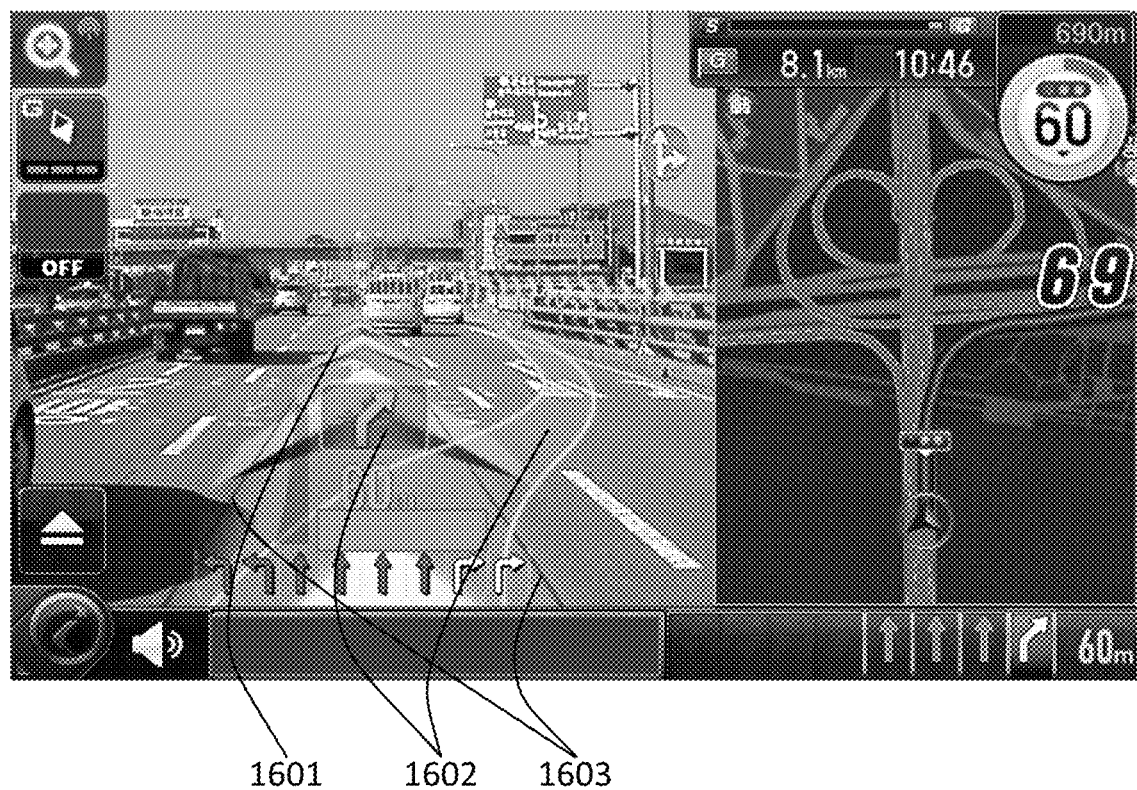
FIG. 16 is a view illustrating a route guide screen according to an embodiment of the present invention.

FIG. 16 is a view illustrating a route guide screen according to an embodiment of the present invention. Referring to FIG. 16, the electronic apparatus 100 according to an embodiment of the present invention may display together the route screen guide screen (left screen) on the AR and the route guide screen (right screen) on the map.

In this case, the AR provision unit 160 may generate an indicator which is overlapped on the AR for a guide on the AR.

As an example, as illustrated in FIG. 16, the AR provision unit 160 may generate a route guide indicator 1601, a lane change guide indicator 1602, and a line departure guide indicator 1603. In addition, the AR provision unit 160 may output the generated indicators on the AR.

Figure 17:
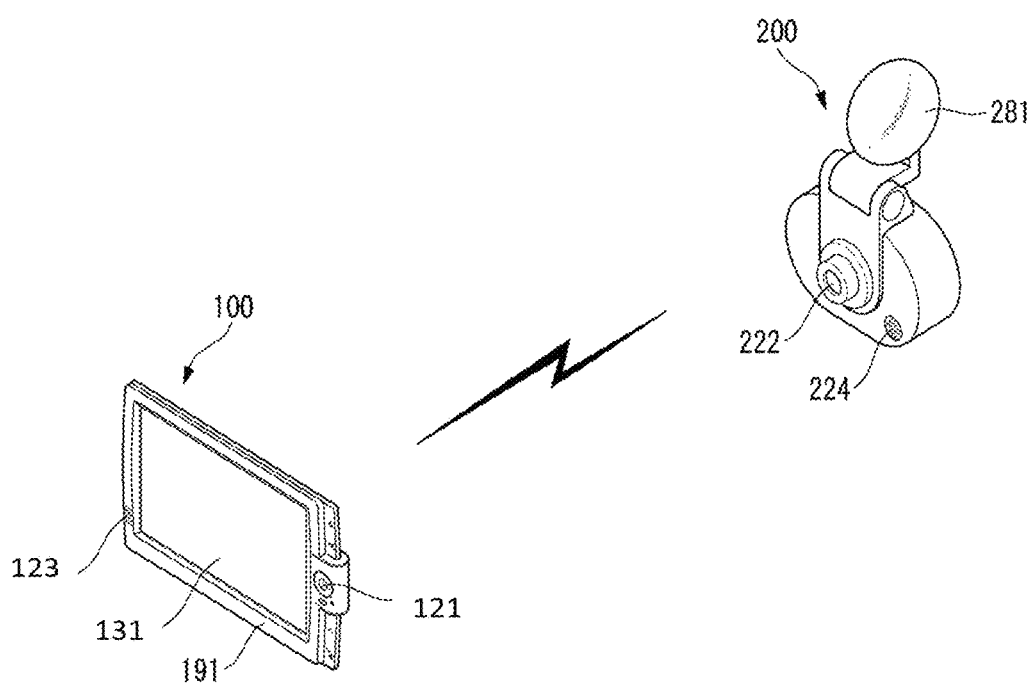
FIG. 17 is a view depicting an implementation form in case where a camera and an electronic apparatus are separate types according to an embodiment of the present invention.

FIG. 17 is a view depicting an implementation form wherein the camera and the electronic apparatus are separate types according to an embodiment of the present invention. Referring to FIG. 17, a vehicle black box 200 which is provided separate from the vehicle navigation 100 may constitute the system according to an embodiment of the present invention using the wired/wireless communication method.

The vehicle navigation 100 may include, but not limited to, a display unit 145 provided at a front portion of a navigation housing 191, a navigation controlling key 193, and a navigation microphone 195.

The vehicle black box 200 may obtain a data of a vehicle during the running or stop of the vehicle. Namely, it is possible to photograph the images during the running of the vehicle and the images even when the vehicle is stop. The quality of the images obtained through the vehicle black box 200 may be constant or vary. As an example, the quality of the images before or after the occurrence of an accident may be high, and in the normal occasions, the quality of the images is low so as to minimize the required storing space since it needs to store important images.

The vehicle black box 200 may include, but not limited to, a black box camera 222, a black box microphone 224 and an attaching unit 281.

Meanwhile, FIG. 17 depicts that the vehicle black box 200 provided separate from the vehicle navigation 100 is connected in a wired/wireless communication method, but the vehicle navigation 100 and the vehicle black box 200 may not be connected in the wired/wireless communication method. In this case, if a storing medium capable of storing the photographed images of the black box 200 is inserted in the electronic apparatus 100, the electronic apparatus 100 may have a function of the vehicle navigation 100 or the vehicle navigation 100 may be integrally provided. This configuration, as depicted in FIG. 18, will be described in detail.

Figure 18:
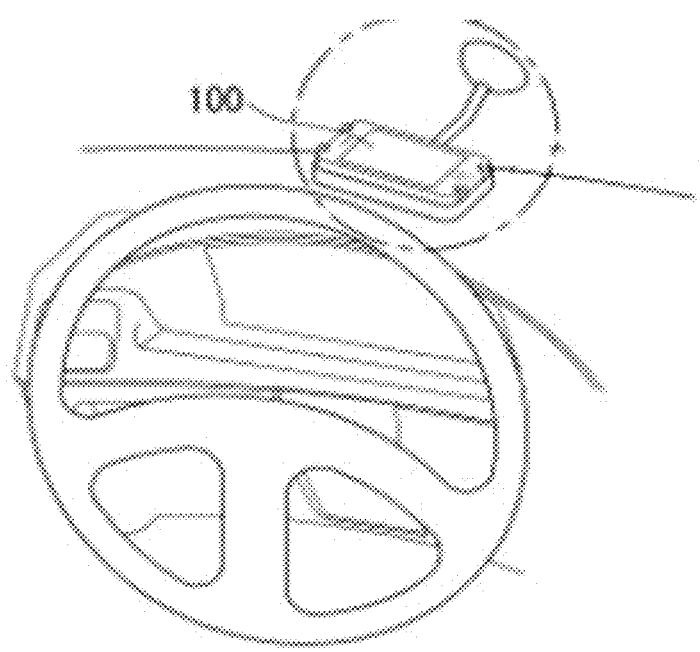
FIG. 18 is a view illustrating an implementation form in case where a camera and an electronic apparatus are integrated types according to an embodiment of the present invention.

FIG. 18 is a view depicting the implementation form wherein the camera and the electronic apparatus are integral, according to an embodiment of the present invention. Referring to FIG. 18, if the electronic apparatus has a camera function, the user may install the electronic apparatus which allows a camera portion of the electronic apparatus to photograph the forward scenes of the vehicle and the display portion of the electronic apparatus to recognize the user, thus implementing the system according to an embodiment of the present invention.

Figure 19:
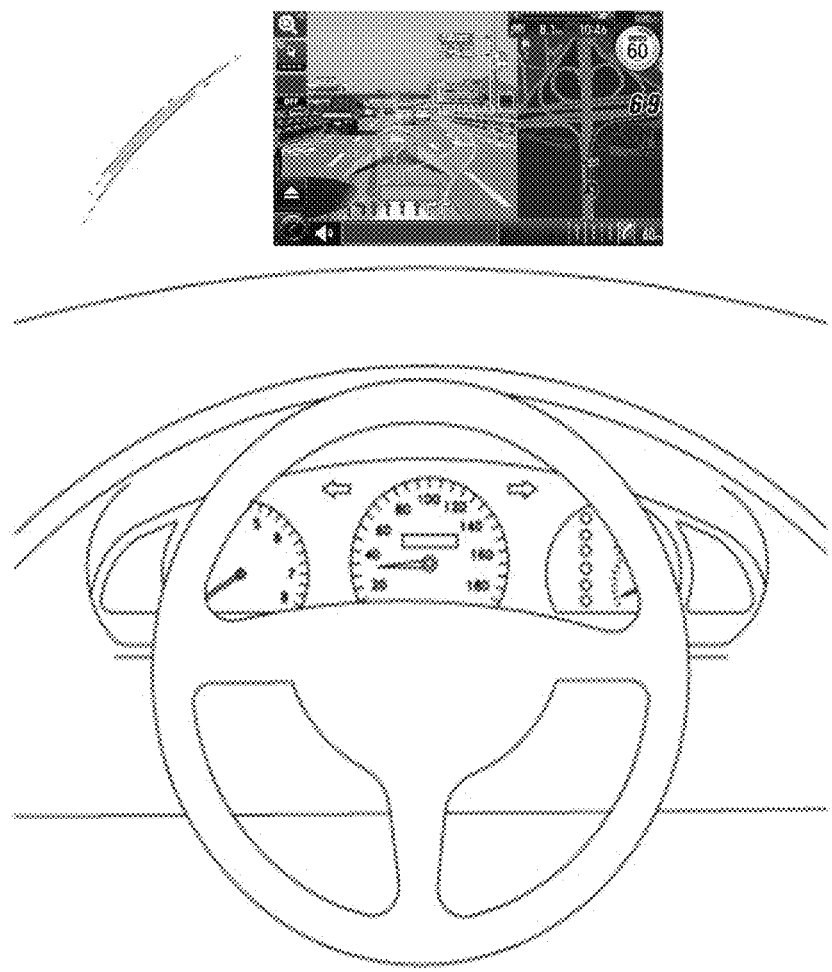
FIG. 19 is a view illustrating an implementation form which uses a HUD (Head-UP Display) and an electronic apparatus according to an embodiment of the present invention.

FIG. 19 is a view depicting the implementation form by using the HUD (Head-UP Display) and the electronic apparatus according to an embodiment of the present invention. Referring to FIG. 19, the electronic apparatus may display the AR guide screen on the head-up display with the help of the head-up display and the wired/wireless communication.

Meanwhile, the control method of the electronic apparatus according to various embodiments of the present invention are implemented in the form of program codes, which may be provided to each server or device in a state where such program devices are stored in various non-transitory computer readable medium.

The non-transitory computer readable medium is not a medium, for example, a register, a cash, a memory, etc., which is designed to store for short time period, but a medium which may store data semi-permanently and may be read by a device. In detail, the above various applications or programs may be stored in the non-transitory readable medium, for example, CD, DVD, a hard disk, a blue ray disk, USB, a memory card, ROM, etc.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A control method of an electronic apparatus, comprising:

generating, by one or more processors, line type information and line color information of lines formed at both sides of a lane where a vehicle is located using a driving-related image data of the vehicle, wherein the line type includes a solid line and a dotted line;

determining, by one or more processors, lane position information of the vehicle by comparing the line type information and the line color information with a prestored lane judgement table;

determining, by one or more processors, a driving direction of the lane where the vehicle is located based on the lane position information;

determining, by one or more processors, whether a lane change is needed by comparing the driving direction of the lane where the vehicle is located with a route direction at a turn point when there is the turn point on the route ahead of the vehicle;

outputting, by one or more processors, a lane change guide when the lane change is needed;

generating, by the one or more processors, a route guide, based on the lane position information, that starts from a point of an augmented reality image corresponding to a current location of the vehicle and heading toward a destination on the route;

generating, by the one or more processors, a route direction object representing the route direction at a turn point; and displaying, by one or more processors, the generated route guide object and the route direction object on a lane area of the augmented reality image, wherein the pre-stored lane judgement table defines the line type information and line color information of each lane position.

2. The method of claim 1, wherein the determining whether the lane change is needed comprises:

acquiring route information to the destination from map data;

acquiring location information of the vehicle; and detecting the turn point located within a predetermined distance from the vehicle using the location information and the route information.

3. The method of claim 2, wherein the determining whether the lane change is needed further comprises:

determining that the lane change is not needed when the driving direction of the lane where the vehicle is located is same as the route direction at the turn point; and determining that the lane change is needed when the driving direction of the lane where the vehicle is located is different from the route direction at the turn point.

4. The method of claim 3, further comprising:

displaying a lane change guide indicator on the lane area of the augmented reality image when the lane change is needed.

5. The method of claim 4, wherein the lane change guide object is an arrow shape having a start point and an end point, and wherein the start point indicates a first lane where the vehicle is currently located, and the end point indicates a second lane to which the location of the vehicle needs to be changed.

6. The method of claim 1, further comprising:

outputting a guidance that the lane change is not needed when the lane change is not needed.

7. The method of claim 1, further comprising:

acquiring from map data information on a number of lanes on a road in which the vehicle is running, wherein the determining whether the lane change is needed comprises:

when the lane change is needed determining an order of the lane to be changed based on the information on the number of lanes of the road and the lane position information.

8. An electronic apparatus, comprising one or more processors configured to:

generate line type information and line color information of lines formed at both sides of a lane where a vehicle is located using a driving-related image data of the vehicle, wherein the line type includes a solid line and a dotted line;

determine lane position information of the vehicle by comparing the line type information and the line color information with a prestored lane judgement table;

determine a driving direction of the lane where the vehicle is located based on the lane position information and determine whether a lane change is needed by comparing the driving direction of the lane where the vehicle is located with a route direction at a turn point when there is the turn point on the route ahead of the vehicle;

output a lane change guide when the lane change is needed, generate a route guide object, based on the lane position information, that starts from a point of an augmented reality image corresponding to a current location of the vehicle and heading toward a destination on a route, generate a route direction object representing the route direction at a turn point; and display the generated route guide object and the route direction object on a lane area of the augmented reality image, wherein the pre-stored lane judgement table defines the line type information and line color information of each lane position.

9. The apparatus of claim 8, wherein the one or more processors acquire route information to the destination from map data, acquire location information of the vehicle and detect the turn point located within a predetermined distance from the vehicle using the location information and the route information.

10. The apparatus of claim 9, wherein the one or more processors determine that the lane change is not needed when the driving direction of the lane where the vehicle is located is same as the route direction at the turn point and determine that the lane change is needed when the driving direction of the lane where the vehicle is located is different from the route direction at the turn point.

11. The apparatus of claim 10, wherein the one or more processors further configured to:

display a lane change guide indicator on the lane area of the augmented reality image when the lane change is needed.

12. The apparatus of claim 11, wherein the lane change guide object is an arrow shape having a start point and an end point, and wherein the start point indicates a first lane where the vehicle is currently located, and the end point indicates a second lane to which the location of the vehicle needs to be changed.

13. The apparatus of claim 8, wherein the one or more processors further configured to:

output a guidance that the lane change is not needed when the lane change is not needed.

14. The apparatus of claim 8, wherein the one or more processors acquire from map data information on a number of lanes of a road in which the vehicle is running and determine an order of the lane to be changed based on the information on the number of lanes of the road and the lane position information when the lane change is needed.

15. A non-transitory computer readable storage medium containing instructions, that when executed by one or more processors, cause the one or more processors to perform a method, the method comprising:

generating line type information and line color information of lines formed at both sides of a lane where a vehicle is located using a driving-related image data of the vehicle;

determining lane position information of the vehicle by comparing the line type information and the line color information with a prestored lane judgement table;

determining a driving direction of the lane where the vehicle is located based on the lane position information;

determining whether a lane change is needed by comparing the driving direction of the lane where the vehicle is located with a route direction at a turn point when there is the turn point on the route ahead of the vehicle;

outputting a lane change guide when the lane change is needed;

generating a route guide object, based on the lane position information, that starts from a point of an augmented reality image corresponding to a current location of the vehicle and heading toward a destination on a route;

generating a route direction object representing the route direction at a turn point; and displaying the generated route guide object and the route direction object on a lane area of the augmented reality image, wherein the pre-stored lane judgement table defines the line type information and line color information of each lane position.

16. The non-transitory computer readable storage medium of claim 15, wherein the determining whether the lane change is needed further comprises:

determining that the lane change is not needed when the driving direction of the lane where the vehicle is located is same as the route direction at the turn point; and determining that the lane change is needed when the driving direction of the lane where the vehicle is located is different from the route direction at the turn point.

17. The non-transitory computer readable storage medium of claim 16, wherein the method further comprises;

displaying a lane change guide indicator on the lane area of the augmented reality image when the lane change is needed.

18. The non-transitory computer readable storage medium of claim 17, wherein the lane change guide object is an arrow shape having a start point and an end point, and wherein the start point indicates a first lane where the vehicle is currently located, and the end point indicates a second lane to which the location of the vehicle needs to be changed.

* * * * *